(12) United States Patent
Vakhutinsky et al.

(10) Patent No.: US 12,243,067 B2
(45) Date of Patent: Mar. 4, 2025

(54) MACHINE LEARNING BASED FEDERATED LEARNING WITH HIERARCHICAL MODELING HOTEL UPSELL

(71) Applicant: Oracle International Corporation, Redwood Shores, CA (US)

(72) Inventors: Andrew Vakhutinsky, Sharon, MA (US); Jorge Luis Rivero Perez, Naples, FL (US); Kirby Bosch, Ann Arbor, MI (US); Recep Yusuf Bekci, Montreal (CA)

(73) Assignee: Oracle International Corporation, Redwood Shores, CA (US)

( * ) Notice: Subject to any disclaimer, the term of this patent is extended or adjusted under 35 U.S.C. 154(b) by 92 days.

(21) Appl. No.: 18/049,402

(22) Filed: Oct. 25, 2022

(65) Prior Publication Data

US 2024/0020716 A1    Jan. 18, 2024

Related U.S. Application Data

(60) Provisional application No. 63/368,399, filed on Jul. 14, 2022.

(51) Int. Cl.
*G06Q 30/0201* (2023.01)
*G06N 7/01* (2023.01)
(Continued)

(52) U.S. Cl.
CPC ......... *G06Q 30/0206* (2013.01); *G06N 20/20* (2019.01); *G06Q 10/02* (2013.01); *G06Q 30/0201* (2013.01); *G06Q 50/12* (2013.01)

(58) Field of Classification Search
CPC ..... G06Q 30/0206; G06Q 10/02; G06N 20/20
(Continued)

(56) References Cited

U.S. PATENT DOCUMENTS

2002/0049535 A1    4/2002   Rigo et al.
2002/0065699 A1    5/2002   Talluri
(Continued)

OTHER PUBLICATIONS

"Guide to Digitizing Hotel Upselling and Cross-Selling: Strategies and Tools", https://www.altexsoft.com/blog/hotel-upselling-cross-selling/; Mar. 29, 2022. (Year: 2022).*
(Continued)

*Primary Examiner* — Dione N. Simpson
(74) *Attorney, Agent, or Firm* — Potomac Law Group, PLLC

(57) ABSTRACT

Embodiments upsell a hotel room selection by generating a first hierarchical prediction model corresponding to a first hotel chain, the first hierarchical prediction model receiving reservation data from one or more corresponding first hotel properties, and generating a second hierarchical prediction model corresponding to a second hotel chain, the second hierarchical prediction model receiving reservation data from one or more corresponding second hotel properties. At each of the first hierarchical prediction model and the second hierarchical prediction model, embodiments generate corresponding model parameters. At a horizontal federated server, embodiments receive the corresponding model parameters and average the model parameters to be used as a new probability distribution, and distribute the new probability distribution to the first hotel properties and the second hotel properties.

20 Claims, 19 Drawing Sheets

(51) Int. Cl.
*G06N 20/20* (2019.01)
*G06Q 10/02* (2012.01)
*G06Q 50/12* (2012.01)

(58) Field of Classification Search
USPC ....................................................... 705/7.35
See application file for complete search history.

(56) References Cited

U.S. PATENT DOCUMENTS

| | | |
|---|---|---|
| 2003/0177103 A1 | 9/2003 | Ivanov et al. |
| 2005/0033706 A1 | 2/2005 | Krikler et al. |
| 2006/0149713 A1 | 7/2006 | Walker |
| 2006/0200370 A1 | 9/2006 | Ratliff et al. |
| 2007/0027745 A1 | 2/2007 | Ouimet |
| 2007/0075136 A1 | 4/2007 | Jacob |
| 2007/0130201 A1 | 6/2007 | Ratliff et al. |
| 2007/0241944 A1 | 10/2007 | Coldren et al. |
| 2012/0130726 A1 | 5/2012 | Subramanian |
| 2013/0041902 A1 | 2/2013 | Swann et al. |
| 2014/0095524 A1 | 4/2014 | Fleischman et al. |
| 2014/0214461 A1* | 7/2014 | Diliberto ............ G06Q 30/0201 705/5 |
| 2014/0222518 A1 | 8/2014 | Adkins |
| 2014/0236708 A1 | 8/2014 | Wolff et al. |
| 2014/0310072 A1 | 10/2014 | Wojciechowski |
| 2016/0042302 A1 | 2/2016 | Watanabe et al. |
| 2016/0078374 A1 | 3/2016 | Lippow et al. |
| 2016/0225108 A1* | 8/2016 | Fishberg ............ G06Q 30/0283 |
| 2016/0267402 A1 | 9/2016 | Szabo |
| 2017/0004590 A1* | 1/2017 | Gluhovsky ........ G06Q 30/0204 |
| 2017/0076350 A1 | 3/2017 | Fleischman et al. |
| 2017/0116624 A1 | 4/2017 | Moore et al. |
| 2018/0349471 A1 | 12/2018 | Toudji et al. |
| 2019/0035009 A1 | 1/2019 | Williams et al. |
| 2019/0244230 A1 | 8/2019 | Subramanian et al. |
| 2019/0325463 A1 | 10/2019 | Li et al. |
| 2020/0012956 A1 | 1/2020 | Ikeda et al. |
| 2020/0043072 A1 | 2/2020 | Li et al. |
| 2021/0117780 A1* | 4/2021 | Malik ..................... G06F 9/485 |
| 2021/0117998 A1* | 4/2021 | Cho ........................ G06N 20/20 |
| 2021/0136537 A1 | 5/2021 | Zaltzman et al. |
| 2021/0279647 A1 | 9/2021 | Sivanandam et al. |
| 2022/0335072 A1* | 10/2022 | Blaya ................... G06F 40/186 |
| 2022/0343382 A1 | 10/2022 | Gottschlich et al. |
| 2023/0027411 A1 | 1/2023 | Jafri |
| 2023/0036167 A1 | 2/2023 | Yusuf et al. |
| 2023/0186411 A1 | 6/2023 | Coulthurst et al. |
| 2023/0206265 A1 | 6/2023 | Girija et al. |
| 2023/0419341 A1 | 12/2023 | Anand |

OTHER PUBLICATIONS

Cho et al., Optimal Dynamic Hotel Pricing, May 21, 2018.
Elaheh Fata et al: "Multi-stage and Multi-customer Assortment Optimization with Inventory Constraints", arxiv.org, Cornell University Library, 201 Olin Library Cornell University Ithaca, NY 14853, Jul. 26, 2020, XP081703603, pp. 1-62.
Friedman et al., "Regularization Paths for Generalized Linear Models via Coordinate Descent", Journal of Statistical Software, Jan. 2010, vol. 33, issue 1.
Li, Y., Wang, B. and Caudillo-Fuentes, L.A. (2013) Modeling a hotel room assignment problem. Journal of Revenue and Pricing Management 12: 120-127.
Brownlee, "How to Avoid Overfitting in Deep Learning Neural Networks," Machine Learning Mastery, 16 pages, (Year: 2019).
Desai, "Expedia Recommender System," The Wayback Machine, 8 pages, (2018).
Unknown, IBM SPSS Regression 22, Version 22, 43 pages, (Year: 2016).
Unknown, "UCLA Statistical Methods and Data Analytics", "Logistic Regression: Stata Data Analysis Examples",7 pages, (2022).

* cited by examiner

- STAGE 1: Observed data $Y_{ij} \sim Bernoulli(p_j) \qquad i \in [N_j], j \in [J].$

- STAGE 2: Log-odds model $\log\left(\frac{p_j}{1-p_j}\right) = \alpha_j + x\beta_j \qquad j \in [J],$ $\alpha_j \sim Normal(\mu_{K+1}, \sigma_{K+1}),$

- STAGE 3: Prior model $\beta_{k,j} \sim Normal(\mu_k, \sigma_k) \qquad j \in [J], k \in [K].$ $\mu_k \sim Normal(0, \tau_k) \qquad k \in [K+1],$ $\sigma_k \sim Gamma(2, 0.1) \qquad k \in [K+1],$ $\tau_k \sim Cauchy(0, 2.5) \qquad k \in [K+1].$

Fig. 5

| Text description (document) | unigram | bigram | trigram |
|---|---|---|---|
| 1 King Bed with Sleeper Sofa Nonsmoking | [one, king, bed, sleeper, sofa, nonsmoking] | [one king, king bed, bed sleeper, sleeper sofa, sofa nonsmoking] | [one king bed, king bed sleeper, bed sleeper sofa, sleeper sofa nonsmoking] |
| 1 King Premium w/ In-Room Drinks & Snacks | [one, king, premium, w/, in-room, drink, snack] | [one king, king premium, premium w/, w/ in-room, in-room drink, drink snack] | [one king premium, king premium w/, premium w/ in-room, w/ in-room drink] |
| 2 Queen Premium w/ In-Room Drinks & Snacks | [two, queen, premium, w/, in-room, drink, snack] | [two queen, queen premium, premium w/, w/ in-room, in-room drink, drink snack] | [two queen premium, queen premium w/, premium w/ in-room, w/ in-room drink] |

Fig. 8

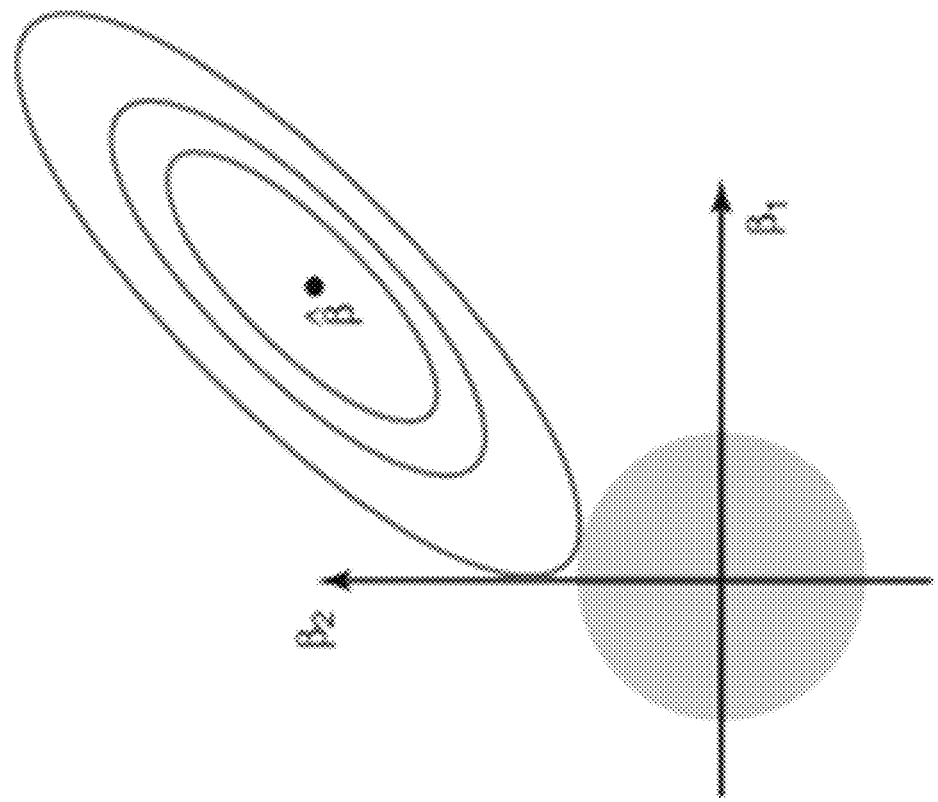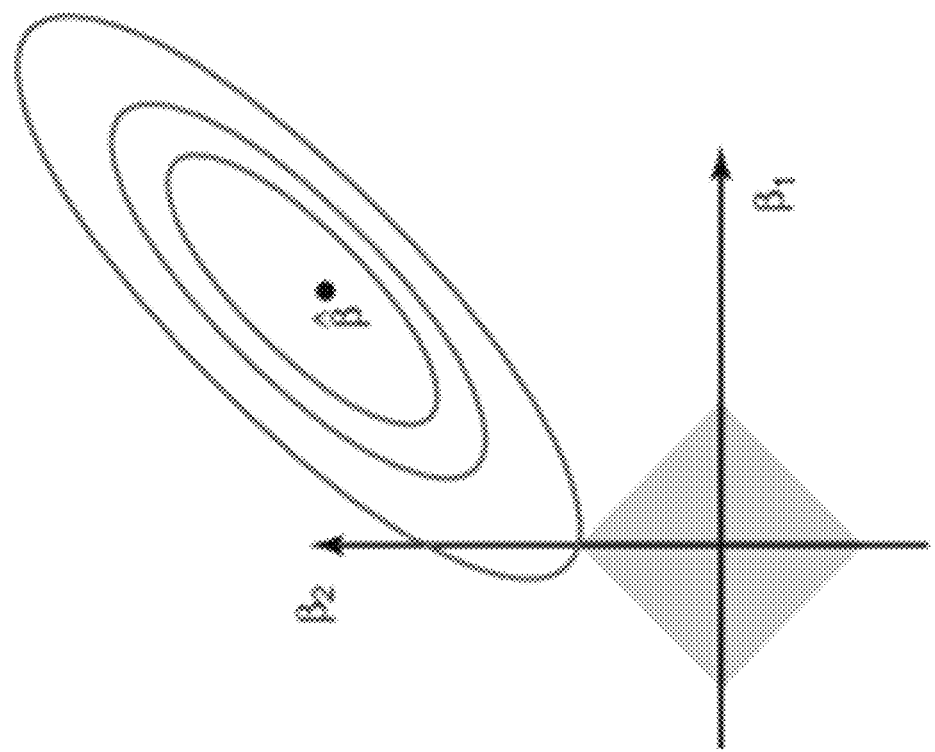
Fig. 10

| Group ID (1901) | Chain ID (Pre Selected) (1902) | Head ID (Pre Selected) (1903) | No. of Instances (1904) | Routing Outcome Ratio (%) (1905) | AUC (Generic Model) (1906) | AUC (Customized Model (Non-Frozen)) (1907) | AUC (Customized (Last Active)) (1908) |
|---|---|---|---|---|---|---|---|
| 1 | Chain A | Property A1 | 61,474 |  | 0.6262 | 0.6821 | 0.7072 |
|  |  | Property A2 | 25,409 | 6.68 | 0.6115 | 0.7056 |  |
|  | Chain B | Property B1 | 16,468 | 10.68 | 0.6338 | 0.6489 | 0.6290 |
|  |  | Property B2 | 30,246 | 10.16 | 0.6714 | 0.6779 |  |
|  |  | Property B3 | 63,886 | 11.72 | 0.6218 | 0.7244 |  |
|  |  | Property B4 | 61,156 | 8.10 | 0.6346 | 0.6503 |  |
|  | Chain C | Property C1 | 23,663 | 8.39 | 0.6637 | 0.6851 | 0.5810 |
|  |  | Property C2 | 28,762 | 4.34 | 0.5918 | 0.6307 |  |
|  |  | Property C3 | 104,909 | 4.82 | 0.5594 | 0.5864 |  |
| 2 | Chain D | Property D1 | 755,717 | 14.50 | 0.7214 | 0.7301 | 0.7093 |
|  |  | Property D2 | 1,447,490 | 3.67 | 0.6912 | 0.6868 |  |
| 3 | Chain E | Property E1 | 825,785 | 3.34 | 0.6795 | 0.6326 | 0.6629 |
|  |  | Property E2 | 700,609 | 4.02 | 0.6570 | 0.6312 |  |
|  |  |  |  | 4.43 |  |  |  |

Fig. 19

MACHINE LEARNING BASED FEDERATED LEARNING WITH HIERARCHICAL MODELING HOTEL UPSELL

CROSS REFERENCE TO RELATED APPLICATIONS

This application claims priority of U.S. Provisional Patent Application Ser. No. 63/368,399, filed on Jul. 14, 2022, the disclosures of which is hereby incorporated by reference.

FIELD

One embodiment is directed generally to a computer system, and in particular to a computer system implementing a machine learning based upsell model.

BACKGROUND INFORMATION

Increased competition in the hotel industry has caused hoteliers to look for more innovative revenue management policies, such as personalized pricing and recommendations. Over the past few years, hoteliers have come to understand that not all guests are equal and a traditional one-size-fits-all policy might prove to be ineffective. Therefore, a need exists for hotels to profile their guests and offer them the right product/service at the right price with the goal of maximizing their profit.

SUMMARY

Embodiments upsell a hotel room selection by generating a first hierarchical prediction model corresponding to a first hotel chain, the first hierarchical prediction model receiving reservation data from one or more corresponding first hotel properties, and generating a second hierarchical prediction model corresponding to a second hotel chain, the second hierarchical prediction model receiving reservation data from one or more corresponding second hotel properties. At each of the first hierarchical prediction model and the second hierarchical prediction model, embodiments generate corresponding model parameters. At a horizontal federated server, embodiments receive the corresponding model parameters and average the model parameters to be used as a new probability distribution, and distribute the new probability distribution to the first hotel properties and the second hotel properties.

BRIEF DESCRIPTION OF THE DRAWINGS

Further embodiments, details, advantages, and modifications will become apparent from the following detailed description of the embodiments, which is to be taken in conjunction with the accompanying drawings.

FIG. 5 illustrates three stages of the hierarchical models in accordance to embodiments.

FIG. 8 illustrates some example text descriptions and the resultant derived unigrams, bigrams and trigrams in accordance to embodiments.

FIG. 10 illustrates L1 and L2 regularizations in accordance to embodiments.

FIG. 19 is a table illustrating improvements through the use of the HFL server of FIG. 4 in accordance to embodiments.

DETAILED DESCRIPTION

Embodiments generate demand modeling for hotels by aggregating historical booking data within a hotel chain to build a hierarchical model using Bayesian Inference for a parameter estimation. The data aggregation amount is controlled by the hierarchical model itself. Embodiments then perform model aggregation among different chains using horizontal federated learning, which allows the sharing of the models among different chains while preserving data privacy. Embodiments then use the models to optimize upselling as well as initial offers.

Upselling is a sales technique used to motivate a customer/user/guest to purchase a more expensive option than the one that the customer initially chooses. When carefully implemented, it can considerably improve revenues. Upselling can be especially useful in industries with "perishable" inventories, such as the hotel and airline industries. Hotel rooms and airplane seats are date-specific products. If a room for a particular date is not booked by that date, the potential revenue that could have been generated is lost permanently. Much like dynamic pricing, upselling can be used to balance supply and demand for multiple classes of products.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
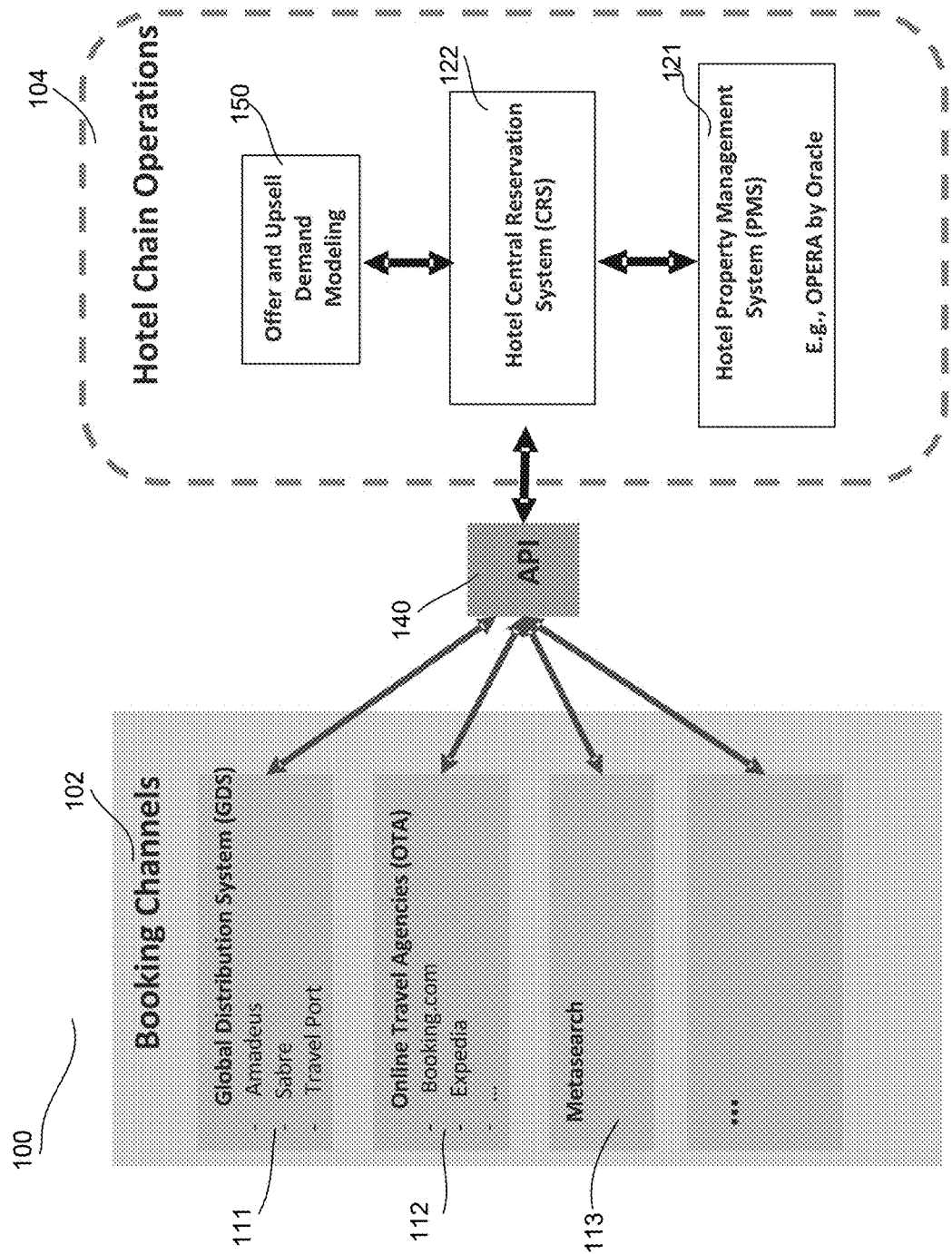
FIG. 1 is an overview block diagram of a hotel reservation system in accordance to embodiments of the invention.

FIG. 1 is an overview block diagram of a hotel reservation system 100 in accordance to embodiments of the invention. FIG. 1 includes booking channels 102 that a potential hotel customer may interact with to reserve a hotel room. The channels include a Global Distribution System ("GDS") 111, including "Amadeus", "Sabre", "Travel Port", etc., Online Travel Agencies ("OTA") 112, including "Booking.com", "Expedia", etc., Metasearch sites 113, and any other means for a customer to reserve a hotel room, including a website maintained by a hotel chain or individual hotel.

Each hotel chain operations 104 is accessed by an Application Programming Interface ("API") 140 as a Web Service such as a "WebLogic Server" from Oracle Corp. Hotel chain operations 104 includes a Hotel Property Management System ("PMS") 121, such as "OPERA Cloud Property Management" from Oracle Corp., a Hotel Central Reservation System ("CRS") 122, and an Offer and Upsell Demand Model module 150 that interfaces with systems 121 and 122 to provide offer and upsell demand modeling and all other functionality disclosed herein.

A hotel customer or potential hotel customer that uses system 100 to obtain a hotel room typically engages in a three stage booking process. First an area availability search is conducted. Multiple hotel chains are shown and hotel CRS 122 provides static data. The static data can include the min/max rate, available dates, etc.

If the booking customer selects a hotel, they go to the next step which is the property search, including a single hotel property, multiple rooms and rate plans. For the single hotel property, information may include room category description data, rate plan description and room price, each of which is shown in a specific order. The property search includes real-time availability data and results in the booking customer selecting a room. Once the room is selected, the final step is final booking and the reservation being guaranteed by a credit card or other form of payment.

Figure 2:
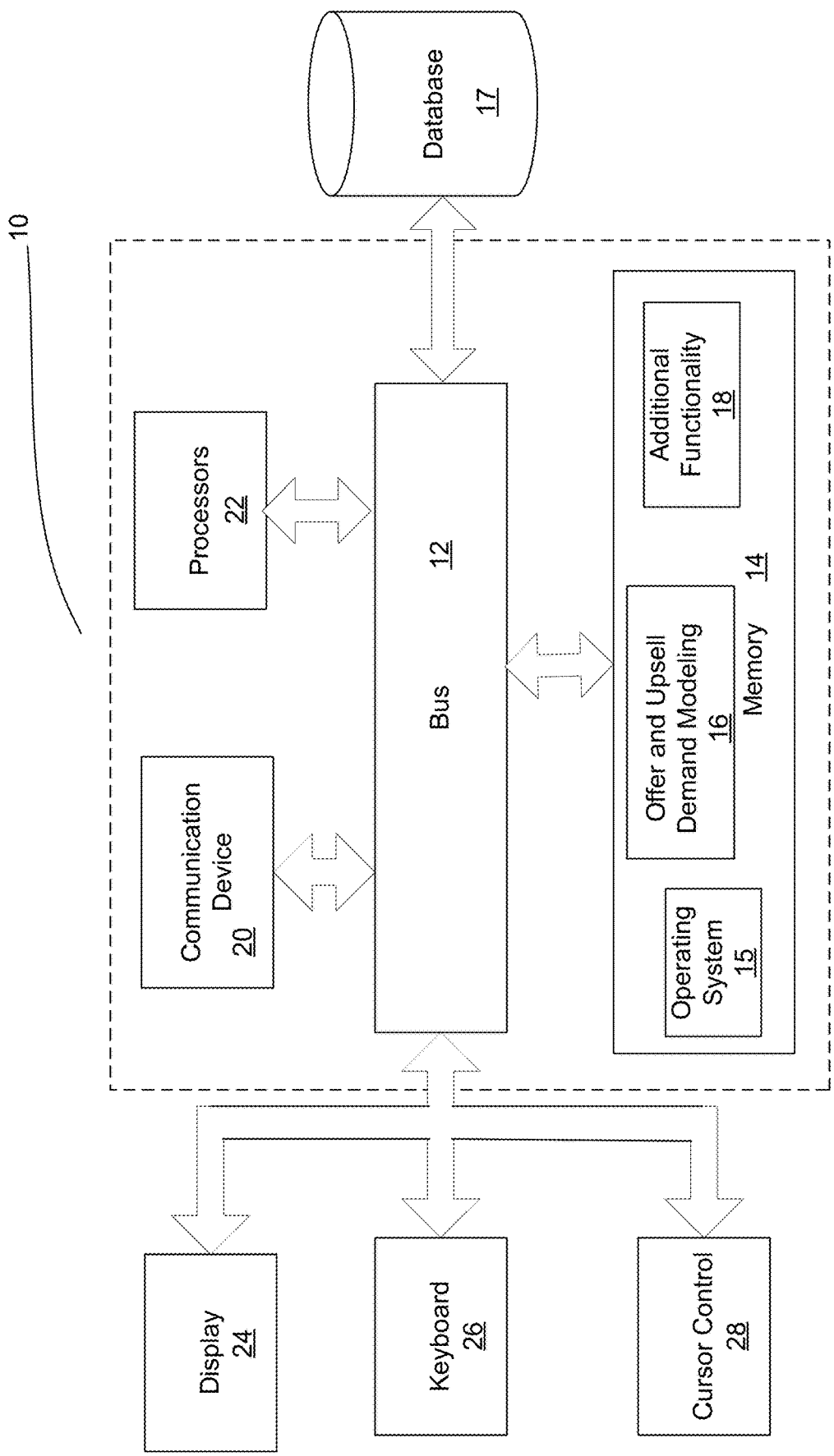
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, when implemented as a web server or cloud based functionality, system 10 is implemented as one or more servers, and user interfaces such as displays, mouse, etc. are not needed. In embodiments, system 10 can be used to implement any of the elements shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include offer and upsell demand modeling module 16 that that models offer and upsell demand, to maximize the expected hotel room revenue, and all other functionality disclosed herein, including generating a predictive Artificial Intelligence ("AI")/machine learning model or models in embodiments. As a hotel variable operating cost is relatively small, the expected revenue (i.e., the product of the room booking probability and room price) is the main optimization objective in embodiments. System 10 can be part of a larger system. Therefore, system 10 can include one or more additional functional modules 18 to include the additional functionality, such as the functionality of a Property Management System ("PMS") (e.g., the "Oracle Hospitality OPERA Property" or the "Oracle Hospitality OPERA Cloud Services") or an enterprise resource planning ("ERP") system. A database 17 is coupled to bus 12 to provide centralized storage for modules 16 and 18 and store guest data, hotel data, transactional data, etc. In one embodiment, database 17 is a relational database management system ("RDBMS") that can use Structured Query Language ("SQL") to manage the stored data.

In one embodiment, particularly when there are a large number of hotel locations, a large number of guests, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Predicting demand for hotel rooms in different categories, coupled with various rate plans, is a key problem in hotel revenue management. It is also a challenging problem as it involves the estimation of a large number of feature-related parameters. Therefore, it requires a large number of observations to make the estimations statistically significant. As the number of bookings observed for a single hotel may not be sufficient, the data from several similar hotels are pooled together. However, since there is a limited number of similar hotels sharing the same characteristics such as location and star level, pooling the data from similar hotels becomes an additional resource for improving the estimation accuracy.

Embodiments of the invention address at least two problems associated with pooling the data: (1) How to efficiently pool together the data from several similar hotels of the same chain (i.e., intra-chain data aggregation); and (2) How to pool together the data from multiple hotels belonging to different chains without violating their data privacy (i.e., inter-chain aggregation). To perform data pooling, two extreme approaches can be employed. In the one extreme, the data can be pooled and used for the whole intra-chain operations. This complete pooling approach creates a bias in the data which means losing individual characteristics of each hotel property. Whereas, in the other extreme, each property can only use its own data. This will reduce the size of the data and result in suboptimal operations. In embodiments, this problem is addressed by hierarchical models which decide the level of aggregation automatically based on the best performance.

Embodiments first train one or more predictive models, which results in estimating model parameters. The model parameters are then used in hierarchical models and then a Federated Learning server, which then shares the model parameters to individual hotel chains, without sharing the underlying data. Embodiments can implement various techniques to estimate the model parameters, including first reducing the number of features before generating the predictive model.

Figure 3:
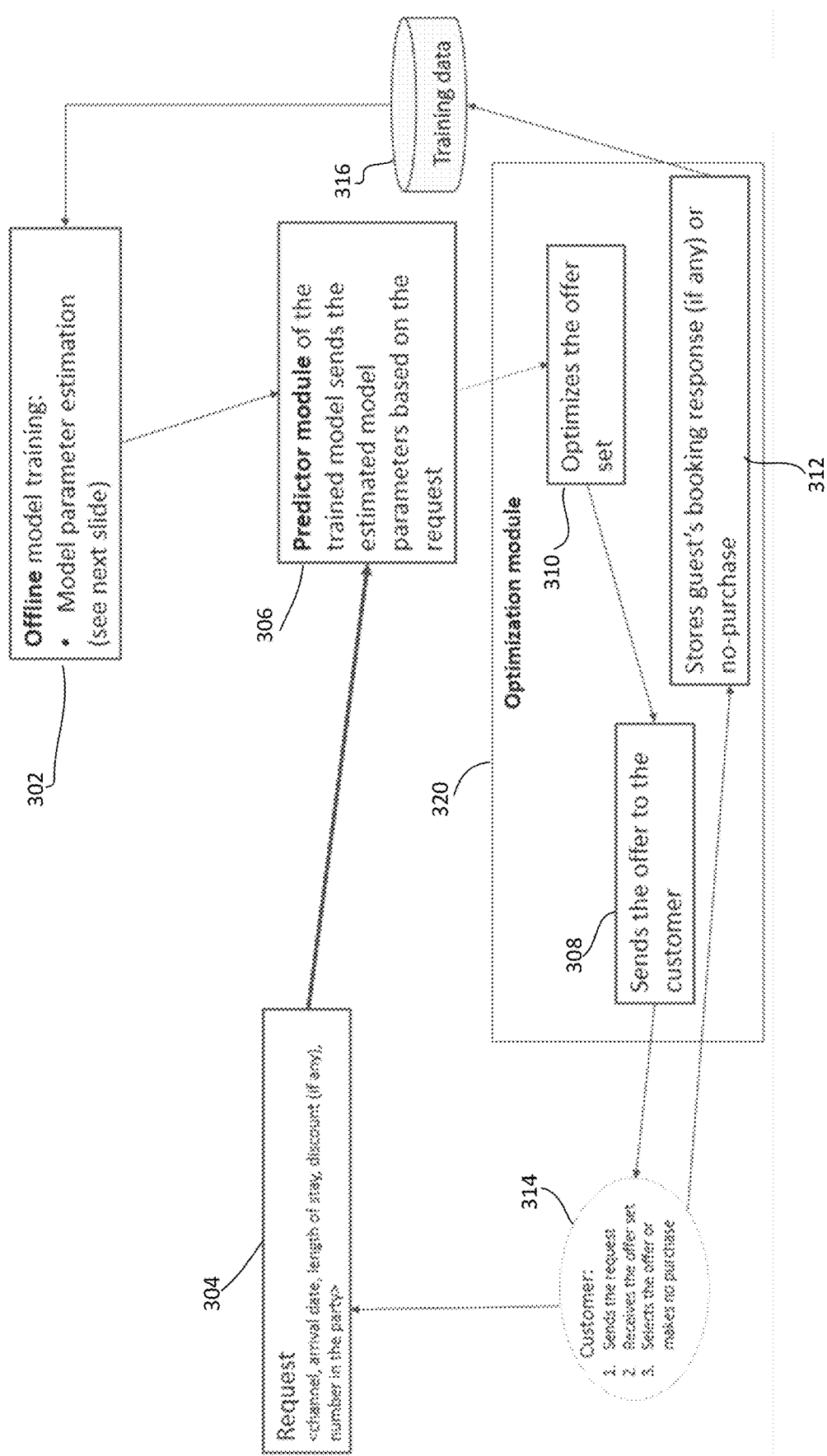
FIG. 3 is a block/flow diagram of an overall initial offer/upsell optimization architecture in accordance to embodiments.

FIG. 3 is a block/flow diagram of an overall initial offer/upsell optimization architecture in accordance to embodiments. In one embodiment, the functionality of the flow diagram of FIG. 3 (and FIGS. 4, 6, 7, 12 and 13 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In general, at 314, a customer sends a request for a hotel room, such as by interacting with system 100 of FIG. 1. The customer then receives an offer set of rooms to book, and then either selects one of the offers, or makes no purchase. The offers may include the initial offers, as well as upsell offers.

A predictor module 306 receives the request, which may include parameters such as channel, arrival date, length of stay, discount (if any), number in the party, etc. Predictor module 306 further receives results from the offline model training at 302, which generates estimated model parameters using hierarchical models and federated learning as disclosed below, as well as clustering in some embodiments. In embodiments, the estimated parameters are as follows:

$\alpha_k$=feature k value (estimated parameter);
$\beta$=price sensitivity coefficient (estimated parameter);
$\gamma$=display position coefficient (estimated parameter).

An optimization module 320 optimizes the offer set at 310, sends the offer to the customer at 308 and stores the customer's booking response (if any) or no purchase in a database 316 (which may be implemented by database 17 of FIG. 2) at 312, which is provided for retraining the offline model at 302.

Figure 4:
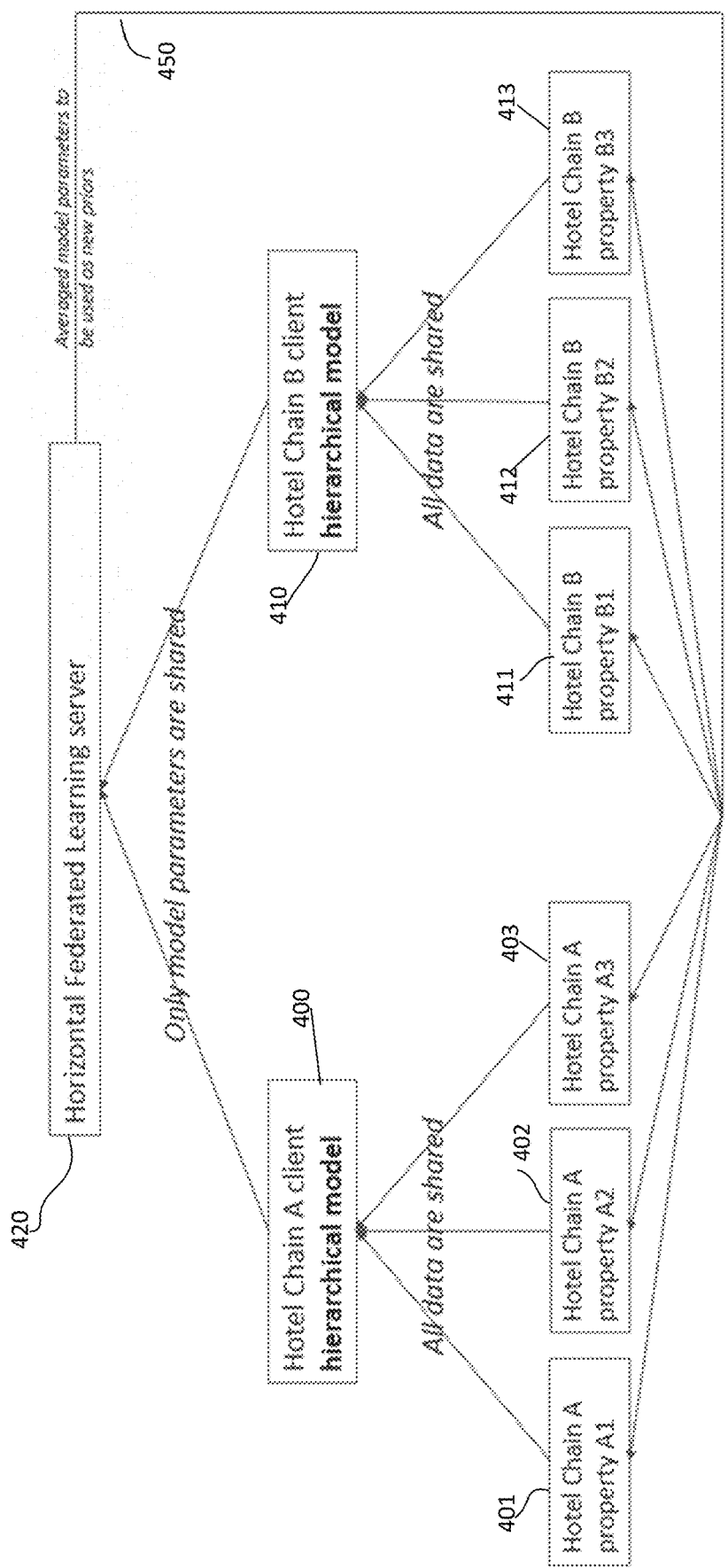
FIG. 4 is a block diagram of the data flow for model training in accordance to embodiments.

FIG. 4 is a block diagram of the data flow for model training in accordance to embodiments. FIG. 4 implements part or all of the functionality of 302 of FIG. 4.

As shown in FIG. 4, in embodiments, each individual hotel chain (e.g., Hilton, Marriott, etc.) has a corresponding hierarchical model 400, 410. Each hotel chain includes multiple properties 401-403 and 411-413 that share their data with their respective hierarchical model. The data in embodiments include the reservation history which includes specific features of each reservation, including room type, rate amount, date of booking, dates of stay, reservation channel and number in the party, as well as some optional parameters such as corporate and group discounts.

Each hierarchical model then shares model parameters with a horizontal federated learning server 420. Only the model parameters are shared, not the data, due to privacy concerns regarding one hotel chain not wanting its data to be available to other competitor hotel chains. Federated learning server 420 averages the received model parameters that are then provided to the hotel chain properties to be used as new priors (i.e., new probability distributions) at 450 as estimated parameters used to train each of the hierarchical models. In embodiments, the averaging is performed as a weighted average, with the weights equal to the number of observations in each hotel chain. The new probabilities can be sent directly to each property (e.g., property level 401-403 and 411-413) to be utilized at the property level, or to the chain level 400, 410, to decide on upsell offers. For the property level, predictions from probability distributions can be used for which upsell offer should be given to a customer with a particular feature data.

In embodiments, hierarchical models 400, 410 use Bayesian inference for modeling hotel chains. Bayesian hierarchical modelling, such as used in embodiments for models 400, 410, is a statistical model written in multiple levels (hierarchical form) that estimates the parameters of the posterior distribution using the Bayesian method. The sub-models combine to form the hierarchical model, and Bayes' theorem is used to integrate them with the observed data and account for all the uncertainty that is present. The result of this integration is the posterior distribution, also known as the updated probability estimate, as additional evidence on the prior distribution is acquired.

In Bayesian inference, a prior probability distribution, often simply called the prior, of an uncertain quantity is the probability distribution that would express one's beliefs about this quantity before some evidence is taken into account. For example, the prior could be the probability distribution representing the relative proportions of voters who will vote for a particular politician in a future election. The unknown quantity may be a parameter of the model or a latent variable rather than an observable variable.

The hierarchical models 400, 410 offer a balance between centralized and decentralized fashions of data usage, by fitting each property's log-odd model independently and using the same prior on the log-odds parameters which connect properties under the same chain. The hotel properties share the same hierarchical models but their parameters estimated as posterior distributions may differ, although the posterior distribution parameters are coming from the same prior distribution.

Since the models builds on the posterior distribution, the hierarchical model has the advantage of quantifying the uncertainty of predictions. Uncertainty quantifications are useful in general decision-making and can be taken into account in upselling offer creation.

Embodiments may use a hierarchical model with multiple layers of hierarchy where the posteriors of the higher levels are used as priors for the lower levels. However, the embodiment of FIG. 4 uses hierarchical models that consist of only two layers, that is, individual properties and the chain they belong to and within which they can share the data. At the next higher level, these models share only their parameters rather than the data by using the Horizontal Federated Learning Server 420.

FIG. 5 illustrates three stages of the hierarchical models in accordance to embodiments. As shown in FIG. 5, the dataset consists of $N_j$ samples from each property $j \in [J]$. In the dataset, each property possesses K predictors. The binary target variable follows a Bernoulli distribution with parameter $p_j$, where $p_j$ is determined according to the log-odds model. The log-odds parameters are determined by Normal distributions that are common for the chain in the second stage. Lastly, the third stage defines the priors for parameters in the second stage. The variables in FIG. 5 include the following:

$y_{ij}$=Boolean variable indicating whether the offer for the room category j was accepted by customer i;

$x_{jk}$=Boolean variable indicating presence of categorical feature k in room category j (e.g., ocean view or king-size bed) or the value of the numerical variable (e.g., room size measured in square feet);

$p_{ij}$=room category j price offered to customer i;

$z_{ij}$=display position of room category j price in the offer to customer i;

$\alpha_k$=feature k value (estimated parameter);

$\beta$=price sensitivity coefficient (estimated parameter);

$\gamma$=display position coefficient (estimated parameter).

Federated learning, as implemented by Horizontal Federated Learning server 420 of FIG. 4, is a distributed training paradigm allowing multiple clients to train a global model without sharing their data. The clients not only contribute to but also benefit from a much larger data set to train the model. Horizontal Federated Learning ("HFL"), or sample-based Federated Learning, implemented by embodiments, is a special federated learning case arising when data sets share the same features but are sampled from the non-intersecting spaces. In embodiments, HFL is used to model demand in the hospitality industry scenario with multiple properties having similar features but booked by mostly different guests.

Figure 6:
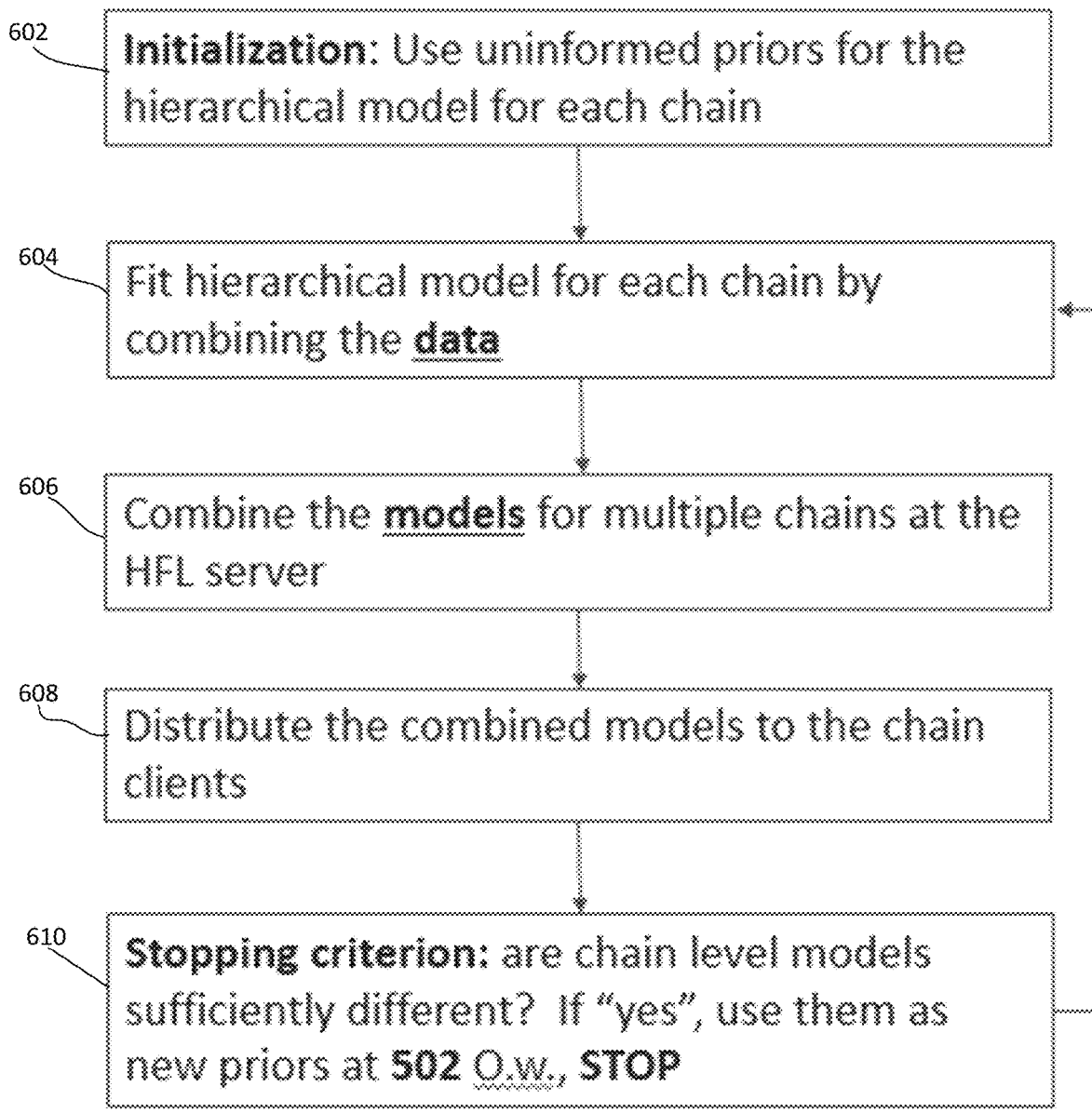
FIG. 6 is a flow diagram of the functionality of the offer and upsell demand modeling of FIG. 1 in accordance to embodiments.

FIG. 6 is a flow diagram of the functionality of offer and upsell demand modeling 150 of FIG. 1 in accordance to embodiments.

At 602, embodiments use uninformed priors for the hierarchical model 400, 410 for each chain for initialization.

At 604, the hierarchical model 400, 410 for each chain is fitted by combining the data.

At 606, the hierarchical models 400, 410 for multiple chains are combined at the HFL server 420. The combining involves sending the model parameters to server 420.

At 608, the combined models, as averaged model parameters to be used as new priors, are distributed to the chain clients via 450 of FIG. 4.

At 610, it is determined if the hierarchical chain level models 400, 410 are sufficiently different. If yes, they are used as the new priors and functionality continues at 602. Otherwise, the functionality of FIG. 6 ends.

Generating Estimated Parameters and Demand Models

Figure 7:
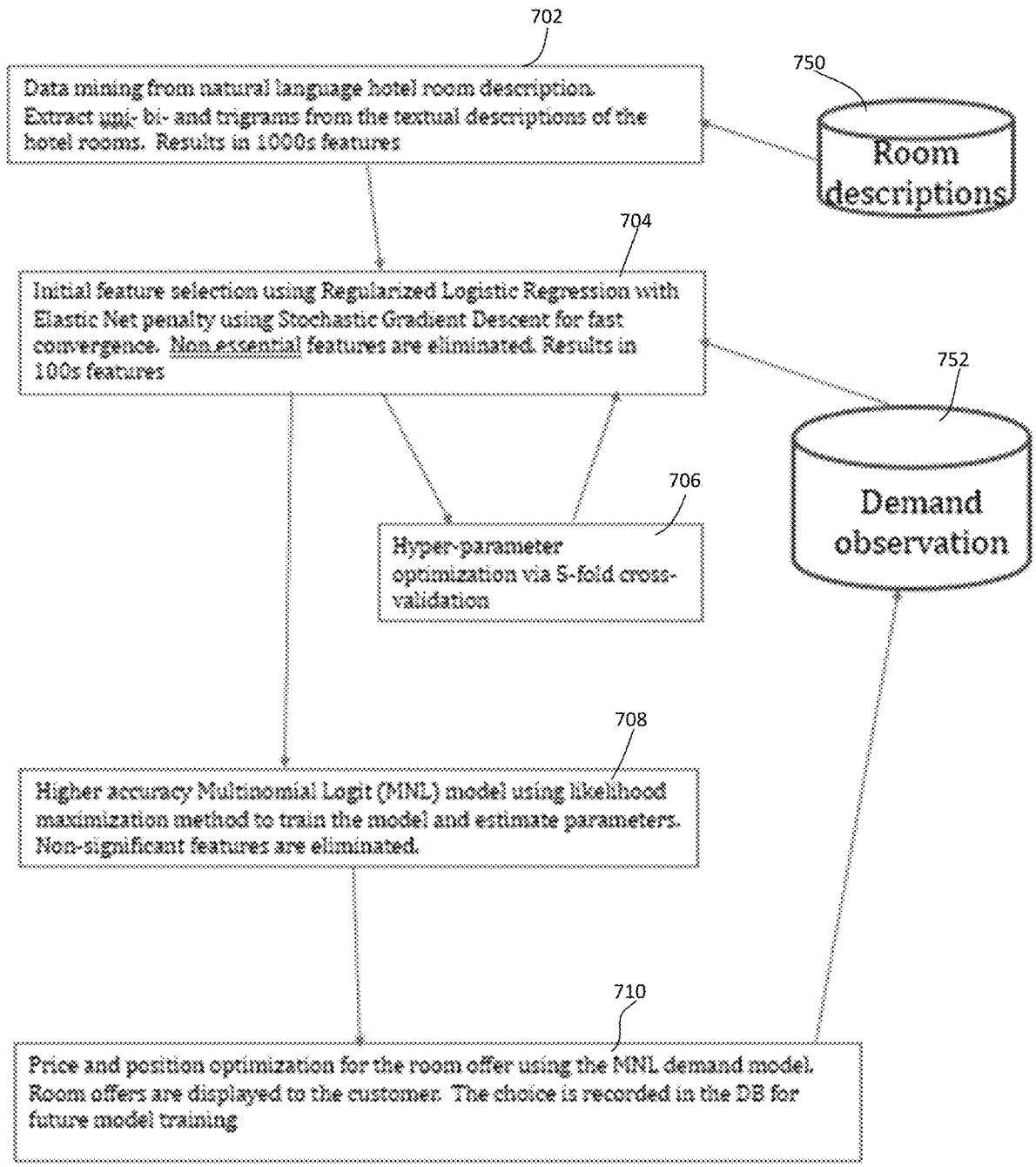
FIG. 7 is a flow diagram that illustrates the functionality of the hotel reservation system of FIG. 1 in accordance to embodiments.

FIG. 7 is a flow diagram that illustrates the functionality of hotel reservation system 100 of FIG. 1 in accordance to embodiments. The functionality of FIG. 7 is used in embodiments to generated each of prediction models 400, 410 of FIG. 4, as well as implementing 302 of FIG. 3 and generating the estimated parameters that are provided to HFL server 420 of FIG. 4.

Feature Extraction

At 702, features are extracted using data mining from the natural language hotel room descriptions. The hotel room descriptions are retrieved from database 750 which in embodiments can be associated with a Hotel Property Management System ("PMS") 121 of FIG. 1, such as "OPERA Cloud Property Management" from Oracle Corp. At 702, in embodiments, each room category description is considered as a separate document, which is tokenized (i.e., broken into separate words or tokens excluding common stop words such as articles and prepositions). After that, unigrams are formed as separate tokens, bigrams are formed as two consecutive tokens and trigrams as three consecutive tokens. FIG. 8 illustrates some example text descriptions and the resultant derived unigrams, bigrams and trigrams in accordance to embodiments.

Figure 9:
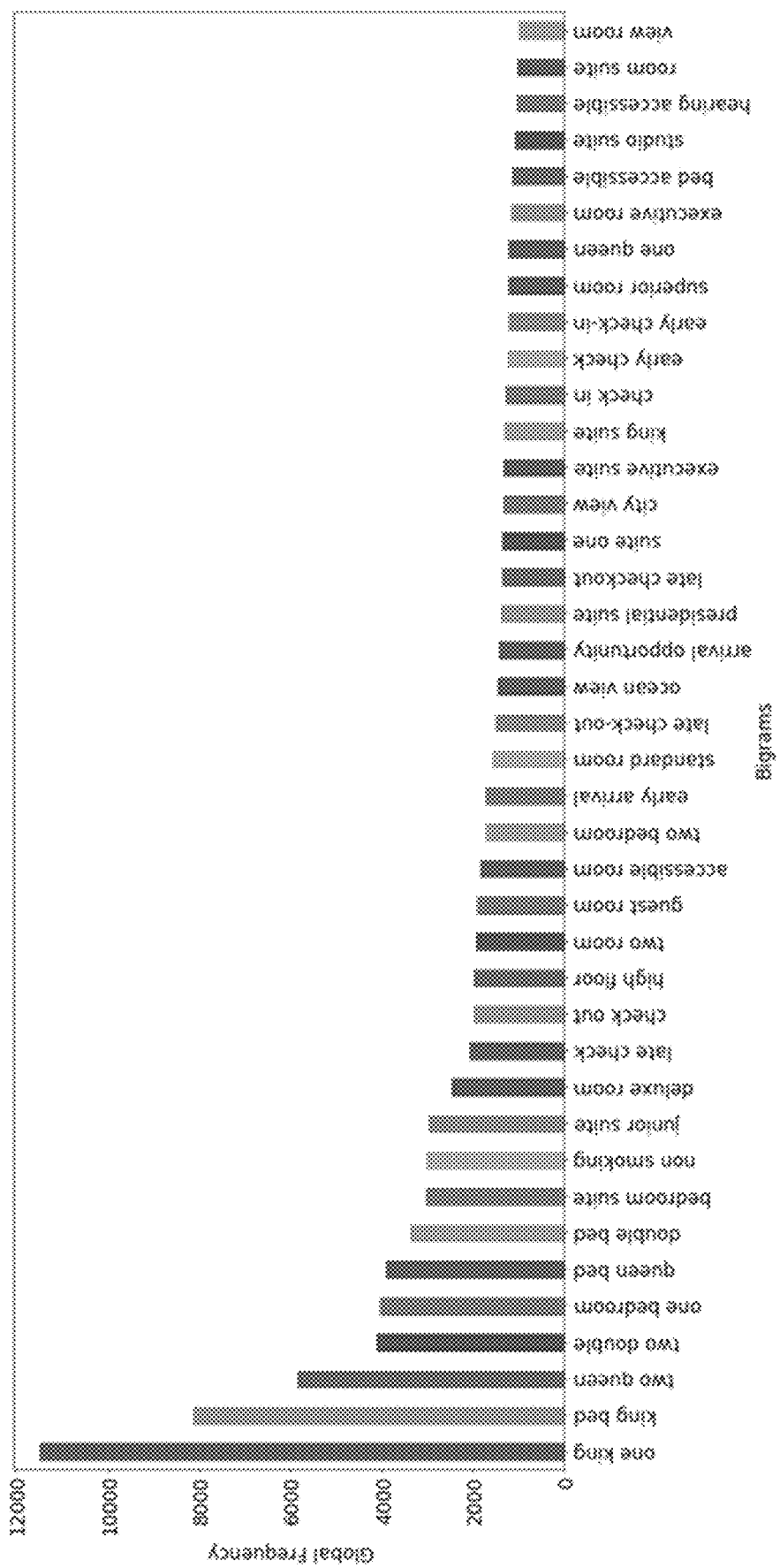
FIG. 9 illustrates an example frequency map for the bigrams in accordance to embodiments.

The unigrams, bigrams, and trigrams are used as features of the demand prediction model. These features are extracted from all documents forming the corpus of all category descriptions. As part of the data visualization, embodiments build a frequency map of the features. FIG. 9 illustrates an example frequency map for the bigrams in accordance to embodiments.

Initial Feature Selection

Because there may be hundreds of different room categories even in a medium-size hotel chain, the feature extraction at 702 generally results in extracting thousands of features from the corpus of category descriptions. Therefore, in order to make the model computationally tractable, the non-essential, duplicated or similar features are eliminated at 704 of FIG. 7.

Specifically, at 704 the features are selected by using a regularized logistic regression model. The model is fitted by likelihood maximization using a stochastic gradient descent ("SGD") procedure. SGD is an iterative method for optimizing an objective function with suitable smoothness properties (e.g., differentiable or subdifferentiable). Each room category offer to a given user forms a single observation used in fitting the model. The output variable is a Boolean variable indicating whether the offer was accepted. The explanatory variables are the category features. The estimated parameters are the weights of the feature variables. In addition, embodiments add the category price and its display position in the offer as other two explanatory variables.

In embodiments, the regularized logistic regression model is as follows:

$$y_{ij} \sim \text{Logit}\left(\sum_{k \in K} \alpha_k x_{jk} - \beta p_{ij} - \gamma z_{ij}\right)$$

where
$y_{ij}$=Boolean variable indicating whether the offer for the room category j was accepted by customer i;
$x_{jk}$=Boolean variable indicating presence of categorical feature k in room category j (e.g., ocean view or king-size bed) or the value of the numerical variable (e.g., room size measured in square feet);
$p_{ij}$=room category j price offered to customer i;
$z_{ij}$=display position of room category j price in the offer to customer i;
$\alpha_k$=feature k value (estimated parameter);
$\beta$=price sensitivity coefficient (estimated parameter);
$\gamma$=display position coefficient (estimated parameter).
Logistic regression models the choice probability as:

$$P_{ij} = \frac{e^{v_{ij}}}{1 + e^{v_{ij}}}$$

where $v_{ij}$=utility of the choice j for customer i $$v_{ij} = \sum_{k \in K} \alpha_k x_{jk} - \beta p_{ij} - \gamma z_{ij}$$

Therefore, given the observation customer set I, the likelihood of these observations is $$L(\alpha_k, \beta, \gamma) = \prod_{i \in I, j \in J_i} \left(\frac{e^{v_{ij}}}{1 + e^{v_{ij}}}\right)^{y_{ij}}$$

and the log-likelihood is $$LL(\alpha_k, \beta, \gamma) = \log L = \sum_{i \in I, j \in J_i} (y_{ij} v_{ij} - \log(1 + e^{v_{ij}}))$$

The "most likely" values of the ($\alpha_k$, $\beta$, $\gamma$) parameters are estimated by maximizing the likelihood or equivalently the log-likelihood function:

($\alpha_k, \beta, \gamma$)=argmax $LL(\alpha_k, \beta, \gamma)$

Since some of the variables may be very similar (or collinear), the solution to the maximization problem above may be unstable. In order to stabilize the solution and also eliminate some of the insignificant variables and their coefficients, embodiments use what is known as "Elastic Net regularization", which is a combination of L1 and L2 regularizations, that is, adding a linear and quadratic penalty terms to the log-likelihood function as shown below where $\theta$=($\alpha_k$, $\beta$, $\gamma$) is the parameter vector.

L1 regularization: $\max_\theta \left(LL(\theta) - \mu \sum_j |\theta_j|\right)$ Equivalent to $\max_\theta LL(\theta)$ subject to: $\sum_j |\theta_j| < \tau$ The optimal solution may have some zero components corresponding to the dropped features.

L2 regularization: $\max_\theta \left(LL(\theta) - \frac{\lambda}{2} \sum_j \theta_j^2\right)$ Equivalent to $\max_\theta LL(\theta)$ subject to: $\sum_j \theta_j^2 < \tau$ Suppresses coefficient growth and adds numerical stability Elastic Net: $\max_\theta \left(LL(\theta) - \left(\mu \sum_j |\theta_j| + \frac{\lambda}{2} \sum_j \theta_j^2\right)\right)$ In the expressions above, $\mu$ and $\lambda$ are the hyper-parameters obtained from the cross-validation based search as described below. FIG. 10 illustrates the L1 and L2 regularizations in accordance to embodiments.

Referring again to FIG. 7, at 706 and as disclosed above, two regularization parameters $\mu$ and $\lambda$ need to be determined. This "tune-up" of the system needs to occur only once, and the results are stored in the configuration file. Therefore, 706 does not need to be implemented in additional iterations of the functionality of FIG. 7.

The search for the best combination of the parameters is performed on a two-dimensional grid. For each combination of the parameter values, the observation set is randomly split into five equal-sized parts. At each of the five iterations, one part is held out for out-of-sample validation, the other four are used for training the model. The parameter combination with the least out-of-sample error averaged over the five cross-validation iterations is selected to be used to fit the model. Denoting by M and Λ the set of the hyper-parameter values, the functionality of 706 can be implemented using the following pseudocode:

```
Initialize: best prediction error ϵ* = +∞
for μ ∈ M:
    for λ ∈ Λ:
        split the observation set S = S₁ ∪ S₂ ∪ ... ∪ S₅
        for k = 1,...,5:
            fit the model on the S\Sₖ observation set
            compute the out-of-sample prediction error on Sₖ
        compute the average out-of-sample error ϵ_μλ
        if ϵ_μλ < ϵ*:
            (μ*, λ*) = (μ, λ)
            ϵ* = ϵ_μλ
return (μ*, λ*)
```

Generate Predictive Model

At 708, the set of features reduced at 706 are used to build a more sophisticated and more accurate predictive model. The limited number of features as compared to the initially extracted features at 704 ensures the computational tractability of the problem. Embodiments fit the MNL-based model and compute the confidence interval for the features.

Initially, embodiments implement a soft clustering approach in order to provide a personalized booking for the hotel guests. In this approach, each guest is assumed to belong to several clusters with a corresponding probability of belonging to each of the clusters. For example, a guest can be belong to a "business traveler" cluster with a probability of 30% and to "vacationer" cluster with a probability of 70%. The number of clusters is set as a configurable hyper-parameter and usually does not exceed four. Finding the optimal number of clusters, H, is a common issue in clustering problems. In practice, the number of clusters in the customer population is often unknown and needs to be determined from the data. If the number of clusters is too large, the proposed mixture model may be subject to overfitting and reduced prediction accuracy. Embodiments treat this issue as a model selection problem and employ the information criteria method for choosing the number of clusters to maximize certain information criteria.

Embodiments begin with soft clustering of the guests by using a Fuzzy C-means algorithm, which is a form of fuzzy clustering (also referred to as "soft clustering" or "soft k-means") in which each data point can belong to more than one cluster. The soft clustering is an unsupervised learning algorithm based on the customer booking parameters known at the time of booking request such as arrival date, length of stay, number in the party, corporate discounts, etc., as disclosed in U.S. patent application Ser. No. 16/784,634, the incorporation of which is hereby incorporated by reference, and can be specified as follows:

1. Given the set of data points $a_i$ corresponding to the booking parameters of customer i, use the preselected number of clusters H.
2. Randomly select $\pi_{ih}$ probabilities of each data point $a_i$ to be in the cluster h.
3. Repeat until the algorithm has converged:
   a. Compute the centroid for each cluster:

$$c_h = \frac{\sum_{i \in I} \pi_{ih}^2 a_i}{\sum_{i \in I} \pi_{ih}^2}$$

b. For each data point i, compute its probability to be in the cluster h:

$$\pi_{ih} = \frac{\|a_i - c_h\|^{-2}}{\sum_{k \in H} \|a_i - c_k\|^{-2}}$$

Further at 708 the probability of selecting an alternative j by the customer i is modeled as discrete choice among multiple alternatives according to an Multinomial Logit ("MNL") model, expressed as follows:

$$P_{ij} = \sum_{h \in H} \pi_{ih} \frac{e^{v_{ij}^h}}{1 + \sum_{\ell \in J_i} e^{v_{i\ell}^h}} \ \forall j \in J_i$$

where $J_i$ is an ordered set of choice alternatives offered to customer i and $\pi_{ih}$ are the soft clustering coefficients that are computed as described above.

Similar to the definition of $v_{ij}$ utility function, cluster-specific utility is defined as:

$$v_{ij}^h = \sum_{k \in K} \alpha_k^h x_{jk} - \beta^h p_{ij} - \gamma^h z_{ij}$$

If the product positions in the set is not known, the display positioning variable $z_{ij}$ is omitted. In order to properly scale the estimated parameters, it is assumed that the utility of the no-purchase case is zero, which is accounted for by 1 in the denominator of the expression for the probability.

As the historic demand observations 752 includes both the offer set and the selection of the offer by each individual (including rejection of any offer), the likelihood function becomes:

$$L = \prod_{i=1}^{N} \prod_{j \in M} \left( \frac{e^{v_{ij}}}{1 + \sum_{\ell \in J_i} e^{v_{i\ell}}} \right)^{\delta_{ji}}$$

where $\delta_{ji}=1$ if customer i chooses product j and zero otherwise. Equivalently, the log-likelihood function can be maximized as follows:

$$LL = \sum_{i=1}^{N} \log \sum_{h \in H} \pi_h \prod_{j \in M} \left( \frac{e^{v_{ij}}}{1 + \sum_{\ell \in J_i} e^{v_{i\ell}}} \right)^{\delta_{ji}}$$

The above model can be reformulated as an "upsell" model to be used for embodiments in determining optimized upselling according to embodiments as follows: Let some item $k_i$ be the initial choice of the customer i. Denote by $C_i$ the set of items that were offered for upsell, with prices changed from some $p_{ij}$ to $p_{ij}^*$. Now the choice set of the customer i consists of all the items in $C_i$, and the initially chosen item $k_i$, which has the original price $p_{k_i}$. Choosing item $k_i$ in this setting would mean that the customer was not willing to accept any of the promotional offers that were presented.

The probability that an upsell offer for an item j will be accepted by a customer i who initially selected item $k_i$ is as follows:

$$P_i^j = \sum_{h \in H} \pi_{ih} \frac{e^{v_{ij}^h - \beta^h(p_{ij}^* - p_{ij})}}{e^{v_{ik_i}^h} + \sum_{\ell \in C_i} e^{v_{i\ell}^h - \beta^h(p_{i\ell}^* - p_{i\ell})}}$$

And the probability that none of the offers will be accepted and the customer i will end up with their initial choice is the following:

$$1 - \sum_{j \in C_i} P_i^j = \sum_{h \in H} \pi_{ih} \frac{e^{v_{ij}^h}}{e^{v_{ik_i}^h} + \sum_{\ell \in C_i} e^{v_{i\ell}^h - \beta^h(p_{i\ell}^* - p_{i\ell})}}$$

Therefore, on a data set with N individuals, where each individual i after selecting some item $k_i$ was shown a set of multiple promotional offers $C_i$, out of which the individual is supposed to select a single upsell offer, the upsell model parameters can be estimated by maximizing the following likelihood function:

$$L = \prod_{i \in N} \prod_{j \in C_i} (\hat{P}_i^j)^{\delta_{ij}} \times \left( 1 - \sum_{j \in C_i} P_i^j \right)^{\overline{\delta}_i}$$

Where $\delta_{ij}$ is an indicator for whether the customer i requests offer j, and $\overline{\delta}_i=1$ if none of the offers were requested by the customer, and equal to 0 otherwise.

The above upsell model can be trained in embodiments as disclosed in using the approach disclosed in U.S. patent application Ser. No. 16/784,634.

The above upsell MNL model can be written as:

$$y_i \sim MNL(v_{ij}, j \in J_i)$$

where $y_i$ is a categorical variable indicating the $i^{th}$ customer's choice.

If the hotel booking data is coming from several similar hotels, instead of pooling the data and estimating the model parameters as common for all groups or estimating the parameters separately for all hotels, embodiments use hierarchical MNL regression. Embodiments formulate the model using Bayesian inference principles. Specifically in formulating the model, the posterior distribution of the parameters is modeled as:

$$y_i \sim MNL(v_{ij}^m, j \in J_i)$$

where $m \in M$ is the index of the hotel and $m=m(i)$, that is, each observation belongs to a single hotel:

$$v_{ij}^{hm} = \sum_{k \in K} \alpha_k^{hm} x_{jk} - \beta^{hm} p_{ij} - \gamma^{hm} z_{ij}$$

The fundamental modeling assumption is that parameters for different hotels are coming from the same normal distributions. For example:

$$\alpha_k^{hm} \sim N(\mu_k, \sigma_k)$$

$$\beta^{hm} \sim N(\mu_\beta, \sigma_\beta)$$

$$\gamma^{hm} \sim N(\mu_\gamma, \sigma_\gamma)$$

and all $\mu$ and $\sigma$ are estimated parameters.

Embodiments use a Bayesian Inference model with the following priors:

$$\mu_k, \mu_\beta, \mu_\gamma \sim N(0, 100)$$

$$\sigma_k, \sigma_\beta, \sigma_\gamma \sim \Gamma(2, 1)$$

Therefore, embodiments use essentially non-informative prior for $\mu$ and Gamma distribution as a prior for $\sigma$ parameter.

At the conclusion of 708, the features with the confidence intervals containing zero are eliminated from the upsell model as insignificant and the resulting upsell model is used at 710 to optimize the prices and display ordering of the upsell offers.

Historic demand observations 752 include both initial offers and upsell offers together with the customer offer selections (including rejection of any offers) at the given historic price. The historic data 752 is used to train the upsell model in order to estimate its parameters. The price and position optimization that follows at 710 is for the "new" incoming offers. At 710, as described below, embodiments determine the optimal prices and positions using the previously estimated model parameters.

In other embodiments, when there are multiple features generated as disclosed above, embodiments implement feature selection by removing features below certain predetermined significance levels (e.g., 5%). More specifically, for each estimated feature parameter, hierarchical models 400, 410 provide its posterior distribution using appropriate methods of model training. Model training for the Bayesian framework can be done with any kind of inference that deals with the posterior distribution. However, a proper way that can work for any type of posterior is Monte Carlo Markov Chain("MCMC"). From this posterior distribution, the application cuts off the lower and upper tails at half the significance level, equal to 2.5% for this example. If the remaining credibility interval contains zero, then the parameter is considered insignificant and not selected to be used in the federated learning.

Using the mathematical formulation, if the significance level denoted by v and the distribution of the estimated parameter $\beta$ is given by the p.d.f. $f(\beta)$, then lower and upper bounds of the credibility interval, respectively, a and b, are determined from the following equations:

$$\int_{-\infty}^{a} f(\beta) d\beta = \frac{v}{2} \text{ and } \int_{b}^{\infty} f(\beta) d\beta = \frac{v}{2}.$$

If a<0 and b>0, then parameter $\beta$ is considered as non-significant at v-level and removed from being considered at the federated learning level for this hierarchical model. In this case, the federated learning model would average this parameter only for the hierarchical models 400, 410 where it was determined to be significant.

Optimization of Pricing and Display Ordering

At 710, the model at 708 and estimated parameters estimated $\alpha$, $\beta$, $\gamma$ parameters from 708 are provided as input to optimize pricing and the display ordering of upsell offers.

Figure 11:
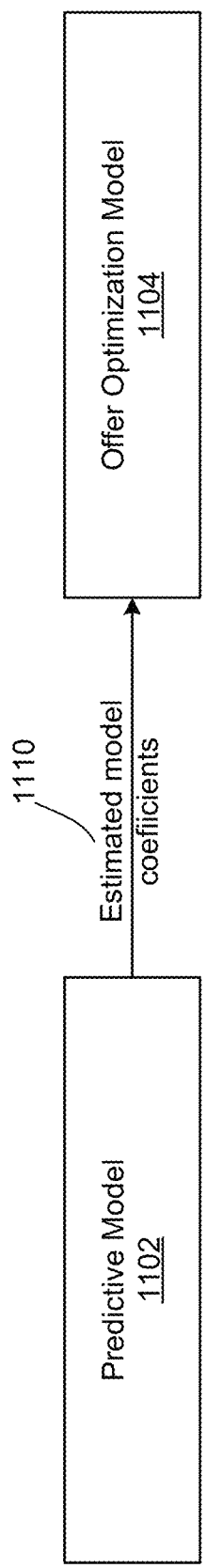
FIG. 11 is an overview block diagram of the functionality of the system of FIG. 1 in in accordance to embodiments of the invention.

FIG. 11 is an overview block diagram of the functionality of system 100 of FIG. 1 in in accordance to embodiments of the invention. In one embodiment, predictive model 1102, generated at 708 of FIG. 7 and used to implement each hierarchical model 400, 410 of FIG. 4 in embodiments, generates estimated model coefficients 1110 (e.g., in embodiments described below, estimated $\alpha$, $\beta$, $\gamma$ coefficients). Predictive model 1102 is a customer behavior model that determines the probability of booking each product (i.e., room-rate combination) based on its order in the list, price, and other factors including the customer persona. Predictive model 1102 estimates coefficients by solving an optimization problem with coefficients as decision variables. The objective of predictive model 1102 is to maximize the fitting of the model with given model variables' values.

Estimated model coefficients 1110 are input to an offer optimization model 1104, which generates the optimized pricing and ordering and display of hotel room choices. Given the estimated coefficient values, optimization model 1104 finds the model variables' values to maximize the objective (i.e., maximize revenues).

Offer optimization model 1104 uses decision variables of the prices and positions of the room options (upsell offers) offered to the customer/guest. The decision variables include: (1) which room options to offer; (2) how to price the room options; and (3) how to arrange the room options. Offer optimization model 1104 provides an optimized personalized searching recommendation offer and the ordering of the rate-grouped room types.

Optimized Display Ordering

In general, embodiments of offer optimization model 1104 are an optimization system that provides a personalized display of the hotel booking options in real-time, with the objective to maximize the expected revenue using the probability computed from a multinomial logit ("MNL") discrete-choice predictive model 1102 trained on the historical observations. In order to personalize the displayed options, embodiments use "soft" clustering of the customer population by assuming that a customer belongs to each cluster with some probability that is predicted by a soft clustering model. The number of clusters is given as a hyper-parameter.

The optimization problem for a given mix of clusters is formulated as a set of fractional-linear programming problems, which are transformed using the Charnes-Cooper transformation (disclosed in Charnes, A.; Cooper, W. W. (1962), "Programming with Linear Fractional Functionals". *Naval Research Logistics Quarterly.* 9 (3-4)) into equivalent linear-programming problems that can be solved by a standard linear-programming package. Since the solution for a given mix of clusters cannot be obtained in "real-time" (e.g., less than 10 ms), embodiments pre-compute the optimal solutions for the points in the multidimensional grid of the fixed cluster mixes. When the cluster mix of a booking customer is determined by predictive model 1102, a nearest point in the grid is found and the pre-computed solution is displayed.

Embodiments enable some degree of the hotel capacity control when the forecast for the future demand for each room category is known. In this case, embodiments can enforce the capacity constraint by using Lagrangian multipliers that are used as a virtual cost of overbooking the rooms. These multipliers are adjusted by using a variant of the gradient search in order to equate the projected demand to the capacity of each room category. As the result, the revenue derived from the high-demand room categories at the risk of over-booking is input into the optimization problem as artificially reduced by the Lagrangian multipliers, thus making it less appealing for booking in the optimal solution.

Figure 12:
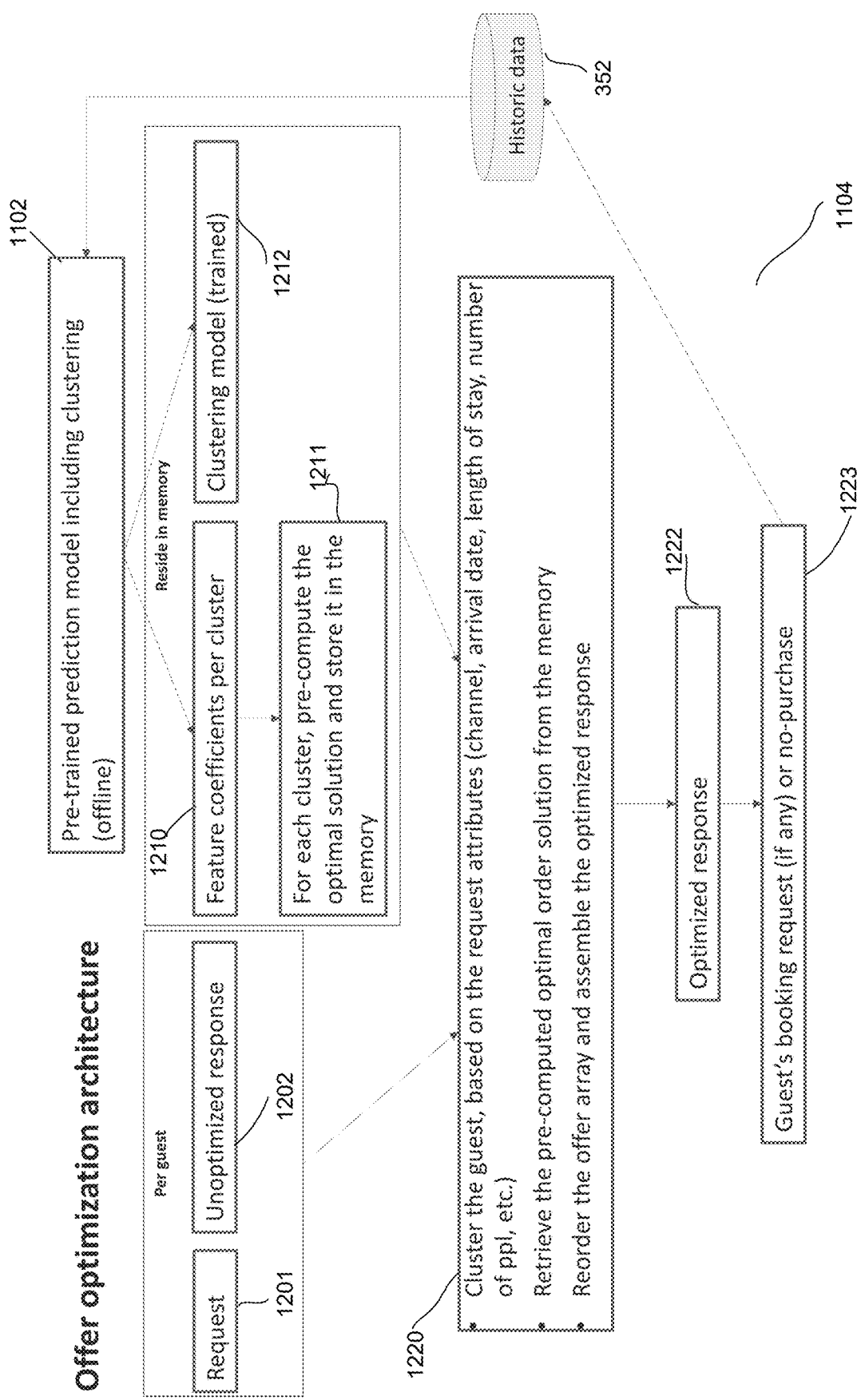
FIG. 12 is an architectural diagram of the offer optimization model of FIG. 7 in accordance to embodiments.

FIG. 12 is an architectural diagram of offer optimization model 1104 of FIG. 11 in accordance to embodiments. Offer optimization model 1104 receives, as input, pre-trained predictive/prediction model 1102. Using prediction model 1102 as input, offer optimization model 1104 stores in memory (e.g., database 17) feature coefficients per cluster 1210 and the clustering model 1212, which is pre-trained as part of prediction model 1102. In embodiments, as disclosed in more detail below, feature coefficients per cluster 1210 include utility intercept $\alpha_j^h$ as well as cluster-specific price coefficient $\beta^h$ and position effects $\gamma_m^h$.

On a per guest/customer basis, offer optimization model 1104 receives a request 1201 for reserving a hotel room and provides an unoptimized response 1202. Response 1202 provides an unoptimized list of room choices to be optimized by the embodiments. The initial unoptimized list of room choices is not presented to the hotel guest.

At 1220, model 1104 clusters the guest, based on the request attributes (channel, arrival date, length of stay, number of ppl, etc.), retrieves the pre-computed optimal order solution from the memory and reorder the offer array and assembles the optimized response. At 1222, the optimized response is generated and presented as an optimized display of hotel room choices. At 1223, the guest provides a booking request, based on selecting a choice from the optimized list, or no-purchases. The selection at 1223 is stored in database 352 as historic data or demand observation, and is provided to prediction model 1102 (at 704 of FIG. 7) which uses the selection as an additional iteration to further train or retrain prediction model 1102.

Deterministic Version

In general, the set of the future room-booking hotel guests, I, is not known exactly although it can be forecasted with some degree of certainty. However, in embodiments it is assumed that it is exactly known, which allows embodiments to solve a deterministic version of the problem. The closer to the arrival, the more accurate the guest count normally becomes, which will be reflected in the adjustments of the Lagrangian relaxation penalty as shown below.

Embodiments assume there are I customers, J products (i.e., hotel room/rate combinations) and M positions in the offer. Each customer belongs to each of H groups with the given probability $\pi_{ih}$. Each product is characterized by a set of given parameters/coefficients that includes its utility intercept $\alpha y$ as well as cluster-specific price coefficient $\beta^h$ and position effects $\gamma_m^h$, respectively, where $\alpha$, $\beta$, $\gamma$ coefficients are estimated from the predictive model 702, described in detail below. The utility of choosing product j by a customer from cluster h is expressed as a linear function $v_{ijm}^h = \alpha_j^h - \beta^h p_{ij} + \gamma_m^h$, where $p_{ij}$ is the price of product j in the product offer as seen by customer i. For all i, j, $p_{ij}$ is in [p, $\bar{p}$]. Further, as not all products may be shown to a customer, $x_{ijm} \in \{0,1\}$ is the offer inclusion variable indicating whether product j is assigned to position m and offered to customer i. Assuming that each customer can choose only one product and the probability of their choice is described by the multinomial logit ("MNL") function of product utilities, the total revenue can be expressed as:

$$R = \sum_{i,j} p_{ij} \cdot \sum_h \pi_{ih} \frac{\sum_m v_{ijm}^h(p_{ij})x_{ijm}}{1 + \sum_{j'=1}^{J}\sum_{m'=1}^{M} v_{ij'm'}^h(p_{ij'})x_{ij'm'}}$$

where $v_{ijm}^h = \exp(v_{ijm}^h) = \exp(\alpha_j^h - \beta^h p_{ij} + \gamma_m^h)$.

The overall problem formulation is:

$$\max R = \sum_{i,j} p_{ij} \cdot \sum_h \pi_{ih} \frac{\sum_m v_{ijm}^h(p_{ij})x_{ijm}}{1 + \sum_{j'=1}^{J}\sum_{m'=1}^{M} v_{ij'm'}^h(p_{ij'})x_{ij'm'}} \quad (1)$$

s.t.

$$\sum_i \sum_{j \in J_c} \sum_h \pi_{ih} \frac{\sum_m v_{ijm}^h(p_{ij})x_{ijm}}{1 + \sum_{j'=1}^{J}\sum_{m'=1}^{M} v_{ij'm'}^h(p_{ij'})x_{ij'm'}} \leq B_c, \forall c \in C \quad (2)$$

$$\sum_j x_{ijm} \leq 1, \forall i \in I, m \in M \quad (3)$$

$$\sum_m x_{ijm} \leq 1, \forall i \in I, j \in J \quad (4)$$

$$x_{ijm} \in \{0,1\}, \forall i \in I, j \in J, m \in M$$

where $B_c$ is the total availability of all products with resources in group c. In the hotel context, it is the number of rooms of the specific category c available on the specific night. The rooms from this category may be booked under different rate-plans (e.g., includes breakfast, fully refundable in case of cancellation, etc.) to form the product group $J_c$ constrained by the availability of the rooms in the category. As products in different $J_c$ sets correspond to different room categories, the $J_c$ sets are disjoint. The constraints of equation 3 above ensure that at most one product is displayed in each position. The constraints of equation 4 above ensure that one product can be displayed in at most one position.

Let $x_{ijm} \in \{0,1\}$ be the offer inclusion variable indicating whether product j is assigned to position m and offered to customer i under price $p_{ij}$. Then denoting the hotel room capacity in category c by $B_c$, embodiments express the capacity constraint as follows:

$$\sum_i \sum_{j \in J_c} \sum_h \pi_{ih} \frac{\sum_{m,k} v_{ijm}^h(p_{ij})x_{ijmk}}{1 + \sum_{j'=1}^{J}\sum_{m'} v_{ij'm'}^h(p_{ij'})x_{ij'm'}} \leq B_c.$$

Introducing Lagrange Multipliers $\{\lambda_c\}_{c=1}^C$ as nonnegative constants, the Lagrange relaxation of the capacity constraints can be expressed by adding the capacity constraint violation to the objective function as shown in equation 5 below, Embodiments formulate a Lagrange Relaxation problem as indicated below:

$$\max \sum_{i,j} \sum_h \pi_{ih} \frac{\sum_{m,k} p_{ij} \cdot v_{ijm}^h(p_{ij}) x_{ijm}}{1 + \sum_{j'=1}^J \sum_{m'} v_{ij'm'}^h(p_{ij'}) x_{ij'm'}} + \qquad (5)$$

$$\sum_c \lambda_c \left( B_c - \sum_i \sum_{j \in J_c} \sum_h \pi_{ih} \frac{\sum_{m,k} v_{ijm}^h(p_{ij}) x_{ijmk}}{1 + \sum_{j'=1}^J \sum_{m'} v_{ij'm'}^h(p_{ij'}) x_{ij'm'}} \right)$$

s.t. $\sum_j x_{ijm} \le 1, \forall i, m$ $\sum_m x_{ijm} \le 1, \forall i, j$ $x_{ijm} \in \{0, 1\}, \forall i, j, m$ Which is equivalent to:

$$(P^R): \max \sum_i \sum_c \sum_{j \in J_c} \sum_h \pi_{ih} \frac{\sum_m (p_{ij} - \lambda_c) v_{ijm}^h(p_{ij}) x_{ijm}}{1 + \sum_{j'=1}^J \sum_{m'} v_{ij'm'}^h(p_{ij'}) x_{ij'm'}}$$

s.t. $\sum_j x_{ijm} \le 1, \forall i, m$ $\sum_m x_{ijm} \le 1, \forall i, j$ $x_{ijm} \in \{0, 1\}, \forall i, j, m$ Single Cluster Case Since the solution of the problem for the cluster mixture is not computationally tractable, embodiments use the following heuristic to obtain a near-optimal solution: Obtain the assortment optimization solutions for each individual cluster and then, among these solutions, select the one that maximizes the expected revenue for the given cluster mix. The solutions for each individual cluster are pre-computed off-line and later retrieved in real time to speed up the computation, as shown below at 527 of FIG. 13. Obtaining a solution for a single cluster is disclosed as follows:

If embodiments with only have one cluster, the problem becomes:

$$(P^{RS}): \max_{x \in \mathbb{R}_+^{JMK}} \sum_c \sum_{j \in J_c} \frac{\sum_{m,k}(p_{ij} - \lambda_c) v_{jm}(p_{ij}) x_{jm}}{1 + \sum_{j'=1}^J \sum_{m'} v_{j'm'}(p_{ij'}) x_{j'm'}} \qquad (6)$$

s.t. $\sum_j x_{jm} \le 1, \forall m$ $\sum_m x_{jm} \le 1, \forall j$ $x_{jm} \in \{0, 1\}, \forall j, m$ Since $v_{jm}(p_k) \ge 0$, the objective function is a fractional-linear function and is quasi-convex. Constraints of equations 7 and 8 above are totally unimodular. The integral constraints can be relaxed. Then, by the Charnes-Cooper transformation, (PLS) is equivalent to $$(CC^{RS}): \max_{(y,y_0) \in \mathbb{R}_+^{JMK+1}} \sum_c \sum_{j \in J_c} \sum_{m,k} (p_j - \lambda_c) v_{jm}(p_j) y_{jmk} \qquad (10)$$

s.t. $\sum_j y_{jm} \le y_0, \forall m$ $\qquad (11)$ $\sum_m y_{jm} \le y_0, \forall j$ $\qquad (12)$ $y_{jm} \le y_0, \forall j, m$ $\qquad (13)$ $$y_0 + \sum_{j'=1}^J \sum_m v_{jm}(p_j) y_{jm} = 1 \qquad (14)$$

Therefore, the problem is reduced to solving a linear-programming problem.

Let $(y^*, y_0^*)$ be a basic optimal solution of $(CC^{RS})$, then let $$x_{jm} = \frac{y_{jm}^*}{y_0^*}$$

for $(P^{RS})$, it is shown that x* satisfy the constraints of equations 7 and 8 above, and also gives the same optimal value. As disclosed below, it can be illustrated that $$\frac{y_{jm}^*}{y_0^*} \in \{0, 1\}.$$

Specifically, in a basic optimal solution $(y^*, y_0)$ to $(CC^{RS})$, $$\frac{y_{jm}^*}{y_0^*} \in \{0, 1\}$$

for all $j \in [J]$, $k \in [K]$, $m \in [M]$, so the solution $$\frac{y^*}{y_0^*}$$

is optimal to $(P^{RS})$.

As proof of the above, for the solution $(y^*, y_0)$, defining the slack variables for the first three sets of constraints results in:

$$\sum_{j,k} y_{jm}^* + s_m^{1*} = y_0^*, \forall m \qquad (15)$$

$$\sum_m y_{jm}^* + s_j^{2*} = y_0^*, \forall j \qquad (16)$$

$$y_{jm}^* + s_{jm}^{3*} = y_0^*, \forall j, m \qquad (17)$$

$$y_0^* + \sum_{j'=1}^J \sum_m v_{jm}(p_j) y_{jm}^* = 1 \qquad (18)$$

By the constraints of equations 13 and 14, it is known that $y_0^* > 0$. Denote $\mathcal{N}^0 = \{(j, m): y_{jm}^* \text{ is basic and } s_{jm}^* \text{ is basic}\}$, $\mathcal{N}^1 = \{(j, m): y_{jm}^*$ is basic and $s_{jm}^*$ is nonbasic$\}$ and $\mathcal{N}^2 = \{(j, m): y_{jm}^*$ is nonbasic and $s_{jmk}^*$ is basic$\}$. $|\mathcal{N}^0| + |\mathcal{N}^1| + |\mathcal{N}^1| = JM$. It is claimed that $y_{jm}^* \in \{0, y_0^*\}$ for all $(j, m) \in \mathcal{N}^0$. Define $\mathcal{M} = \{m: s_m^{1*},$ is nonbasic$\}$, $\mathcal{J} = \{j: s_j^{2*}$ is nonbasic$\}$. Then the number of basic variables in $(y^*, y_0^*, s^{1*}, s^{2*}, s^{3*})$ is $1 + 2|\mathcal{N}^0| + |\mathcal{N}^1| + |\mathcal{N}^2| + M + J - |\mathcal{M}| - |\mathcal{J}| = 1 + |\mathcal{N}^0| + JM + M + J - |\mathcal{M}| - |\mathcal{J}| = 1 + JM + M + J$. Therefore, $= |\mathcal{N}^0| + |\mathcal{M}| + |\mathcal{J}|$. Moreover, $s_m^{1*} = 0$ for $m \in \mathcal{M}$, $s_j^{2*} = 0$ for $j \in \mathcal{J}$, and $y_{jm}^* = 0$ for $(j, m, k) \in \mathcal{N}^2$. And for all $(j, m) \in \mathcal{N}^1$, $y_{jm}^* = y_0^*$. So for $m \in \mathcal{M}$, $j \in \mathcal{J}$, there is the following:

$$\sum_{j,k:\ (j,m,k)\in\mathcal{N}^0} y_{jm}^* = \left(1 - \sum_{j,k:\ (j,m)\in\mathcal{N}^1} 1\right) y_0^*$$

$$\sum_{m,k:\ (j,m)\in\mathcal{N}^0} y_{jmk}^* = \left(1 - \sum_{m,k:\ (j,m)\in\mathcal{N}^1} 1\right) y_0^*$$

Since $\mathcal{N}^0 = |\mathcal{M}| + |\mathcal{J}|$, the solution for the above two equations is unique and given by the inverse of the coefficient matrix and the right-hand side vector. The coefficient matrix is unimodular, so its inverse only has $\{-1, 0, 1\}$. Therefore, $y_{jmk}^*$ must be an integer multiple of $y_0^*$. The result is $y_{jmk}^* \in \{0, y_0^*\}$ for all $(j, m) \in \mathcal{N}^0$.

If $(j,m) \in \mathcal{N}^0$, then $y_{jmk}^* \in \{0, y_0^*\}$. If $(j, m) \in \mathcal{N}^1$, then $y_{jm}^* = y_0^*$. If $(j, m) \in \mathcal{N}^2$, then $y_{jm}^* = 0$. Therefore, $\forall j, m, y_{jm}^* \in \{0, y_0^*\}$.

Multiple Cluster General Case

The Lagrange Relaxation problem formulation shows that the maximization problem is independent on customers (on i). So $(P^R)$ is equivalent to a sequence of subproblems $(P^R_i)_{i=1}^I$ $$(P_i^R): \max \sum_c \sum_{j\in J_c} \sum_h \pi_{ih} \frac{\sum_m (p_{ij} - \lambda_c) v_{ijm}^h (p_{ij}) x_{ijm}}{1 + \sum_{j'=1}^J \sum_{m'} v_{ij'm'}^h (p_{ij'}) x_{ij'm'}}$$

$$\text{s.t.} \sum_j x_{ijm} \leq 1, \forall m$$

$$\sum_m x_{ijm} \leq 1, \forall j$$

$$x_{ijm} \in \{0, 1\}, \forall j, m$$

First, letting $$y_i^h = \frac{1}{1 + \sum_j \sum_m v_{ijm}^h (p_{ij}) x_{ijm}}$$

the problem $(P_i^R)$ can be posed as:

$$\max \sum_c \sum_{j\in J_c} \sum_h \pi_{ih} \sum_m (p_k - \lambda_c) v_{ijm}^h (p_{ij}) x_{ijm} y_i^h$$

$$\text{s.t.} \sum_{j,k} x_{ijmk} \leq 1, \forall m$$

$$\sum_{m,k} x_{ijmk} \leq 1, \forall j$$

$$y_i^h + \sum_j \sum_{m,k} v_{ijm}^h (p_k) x_{ijmk} y_i^h = 1, \forall h$$

$$0 \leq y_i^h \leq 1, \forall j, m, k$$

$$x_{ijmk} \in \{0, 1\}, \forall j, m, k$$

Let $z_{ijmk}^h = x_{ijmk} \cdot y_i^h$ $$(P_i^L): \max \sum_c \sum_{j\in J_c} \sum_h \pi_{ih} \sum_{m,k} (p_k - \lambda_c) v_{ijm}^h (p_k) z_{ijm}^h$$

$$\text{s.t.} \sum_{j,k} x_{ijm} \leq 1, \forall m$$

$$\sum_{m,k} x_{ijm} \leq 1, \forall j$$

$$y_h + \sum_j \sum_m v_{ijm}^h (p_{ij}) z_{ijm}^h = 1, \forall h$$

$$z_{ijm}^h \leq y_h, \forall j, m, h$$

$$z_{ijm}^h \leq x_{ijm}, \forall j, m, h$$

$$y_h - z_{ijm}^h \leq 1 - x_{ijm}, \forall j, m, h$$

$$0 \leq y_h \leq 1, \forall h$$

$$x_{ijm} \in \{0, 1\}, \forall j, m$$

$$z_{ijm}^h \geq 0, \forall j, m, h$$

This problem changes to solve a mixed-integer linear formulation.

Implementation Details

Embodiments solve the above problems using a linear-programming approximation algorithm, or a swap heuristic algorithm. Embodiments use the following heuristic algorithms with fixed prices and without capacity constraint:

$$(P^R): \max \sum_j \sum_h \pi_h \frac{\sum_m p_j v_{jm}^h x_{jm}}{1 + \sum_{j'=1}^J \sum_{m'} v_{j'm'}^h x_{j'm'}}$$

$$\text{s.t.} \sum_h x_{jm} \leq 1, \forall m$$

$$\sum_m x_{jm} \leq 1, \forall j$$

$$x_{jm} \in \{0, 1\}, \forall j, m$$

Linear-Programming Approximation

Figure 13:
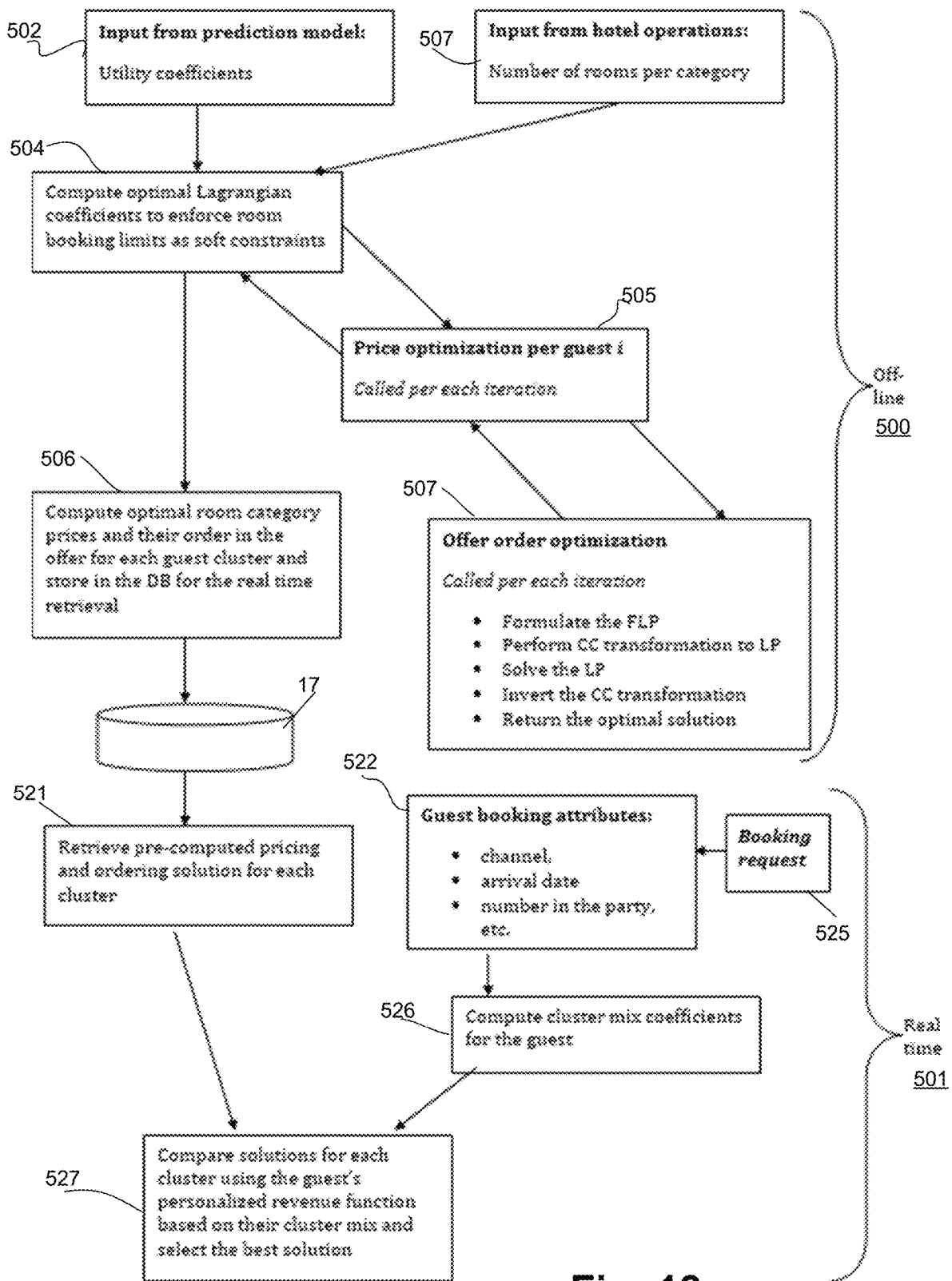
FIG. 13 is a flow diagram that illustrates the functionality of hotel reservation system of FIG. 1 in accordance to embodiments.

If there is only one cluster, the problem is equivalent to a linear-programming problem;
Solve the LP for each cluster to get H solutions (H is the number of clusters);
Calculate the expected revenue under the H solutions, choose the one with the largest expected revenue as the offer. (solved using Python linear programming "Pulp" in embodiments).
FIG. 13 is a flow diagram that illustrates the functionality of room hotel reservation system 100 of FIG. 1 in accordance to embodiments. The functionality of FIG. 13 includes an "off-line" portion 500 which uses the input from the pre-trained prediction model 1102 in the form of the estimated parameter values of the model and pre-solves the single cluster problems for each individual cluster using the expected hotel bookings in anticipation of a customer requesting to reserve/book a hotel room. A "real-time" portion 501 is in response to the customer requesting a hotel room, and results in the optimized ordering of hotel room choices displayed to the customer.

Input data of FIG. 13 includes the input at 502 from pre-trained prediction model 1102 (disclosed in detail below) of the utility coefficients (i.e., the estimated $\alpha$, $\beta$, $\beta$ coefficients from the predictive model). At 503, the input from hotel operations is also received, such as the inventory of the number of available rooms per category based on the configuration of each hotel property as provided by the property management. For example, the hotel could be configured as having 100 rooms with two queen-size beds and 50 rooms with one king-size bed.

At 504, the optimal Lagrangian coefficients are determined to enforce room booking limits as soft constraints. At 504, the inputs include the $\alpha$, $\beta$, $\gamma$ utility coefficients as estimated from the predictive model (502) and per-category capacities $B_c$ (503). The output is the optimal Lagrange coefficients $\lambda_c^*$, $c \in C$ as well as optimal prices and assortment of the offers for each cluster. This problem is solved by using a standard gradient-based continuous optimization procedure, which is performed as a nested iterative process. Each iteration performed at 504 includes determining the gradient of the optimal revenue as a function of the Lagrange coefficients, which involves determining the optimal revenue $R_0(\lambda)$ for the current values of the coefficients $\lambda$ by solving the price optimization problem at 505 using the gradient obtained by computing ($B_c$—totalDemandEstimate), as described in equation 5 above. At 504, the iterative process converges to the optimal Lagrange coefficients $$\lambda^* = \underset{\lambda}{\mathrm{argmax}} R_0(\lambda)$$

At 505, the price is optimized per guest i by implementing another iterative gradient search. At 505, the inputs include the Lagrangian coefficients A, from 504 and the $\alpha$, $\beta$, $\gamma$ utility coefficients as estimated from prediction model 302. At 505, the output is the optimal prices $p_{ij}^*$. Each iteration of 505 involves determining the value of the optimal-order revenue function $R_i(p_{ij}, \lambda_c)$ by solving the offer sorting optimization problem at 507, which is then used in a standard gradient-based continuous optimization procedure such as L-BFGS-B as implemented in the "SciPy Optimize" package. As the gradient search at 505 finds only a local maxima, embodiments repeat the functionality at 505 multiple times by varying initial variable values in order to find the optimal prices $$p_{ij}^* = \underset{p_{ij}}{\mathrm{argmax}} R_i(p_{ij}, \lambda_c).$$

As function $R_i(p_{ij}, \lambda_c)$ may have multiple local maxima, the problem at the second step may have to be solved.

At 507, the offer order optimization for each guest i is determined. At 507, the input is: fixed prices $p_{ij}$ per room category j; Lagrangian coefficients $\lambda_c$ from 504 and utility values:

$v_{ij} = \alpha_j^{h(i)} - \beta^{h(i)} - \gamma^{h(i)} \Sigma_m \mathrm{mx}_{ijm}$, where $\alpha$, $\beta$, $\gamma$ coefficients are estimated from the predictive model from 502. At 507, the output is the optimal display order (position indicator variables):

$x_{ijm}^* = 1$ if customer i is offered room category j at position m; 0, o.w. Specifically, at 507, for each cluster h E H, embodiments solve the Fractional Linear Programming ("FLP") problem $P^{RS}$ (equations 6-9 above) as the Linear Programming ("LP") problem $CC^{RS}$ (equations 10-14 above) using Charnes-Cooper ("CC") transformation to obtain the optimal sorting of the offer for each individual cluster. Embodiments then invert the CC transformation to obtain the optimal sorting solution among the individual cluster solutions, and find the one that would maximize the cluster mix objective function of problem $P^R$ as provided by equation 5 above.

The functionality of each of 504, 505 and 507 is performed iteratively to implement a gradient search at 504 and 505. Each iteration at 504 involves estimating the gradient of the function of the Lagrange coefficients by solving the optimization problem at 505, which is in turn solved iteratively with each iteration of estimating its own gradient by solving the optimization problem at 507.

At 506, the optimal room category prices and their order in the offer for each guest cluster is determined and stored in database 17 and/or higher speed memory to be used for the real-time retrieval.

Real-time portion 501 is initiated at 525 by receiving a booking request from a customer. The booking request for a specific property can include the information about the arrival and departure dates, possible discounts, booking channel, the number of people in the party including the number of children, and other attributes.

At 522, the guest booking attributes are retrieved from the booking request. The attributes include the booking channel, arrival date, number in the party, etc.

At 526, the cluster mix coefficients for the customer/guest corresponding to the booking request is determined based on the clustering model pre-trained as part of prediction model 702.

At 521, the pre-computed pricing and ordering solution for each cluster is retrieved from database 17 or higher speed memory.

At 527, solutions are determined for each cluster at 521 using the guest's personalized revenue function based on their cluster mix and the best solution is selected.

Figure 14:
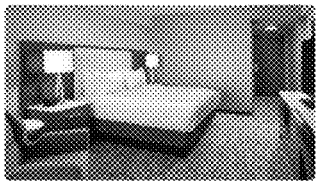
FIG. 14 illustrates an example output solution from the functionality of FIG. 13 in accordance to embodiments of the invention.

FIG. 14 illustrates an example output solution from the functionality of FIG. 13 in accordance to embodiments of the invention. As shown in FIG. 14, a specific display ordering of hotel room choices is displayed, with the display order optimizing revenue for the specific customer that provided the booking request. Further details on the functionality of optimizing pricing and display positioning that is implemented at 710 of FIG. 7 is disclosed in U.S. patent application Ser. No. 17/643,638, the incorporation of which is hereby incorporated by reference FIGS. 15-18 illustrate a sequence of events for when a customer is presented with upsell choices in accordance to embodiments of the invention.

Figure 15:
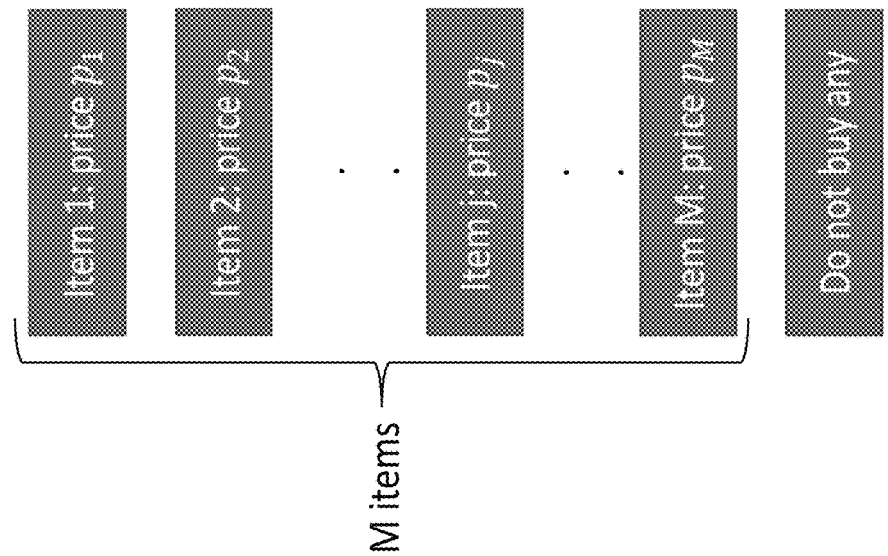
FIGS. 15-18 illustrate a sequence of events for when a customer is presented with upsell choices in accordance to embodiments of the invention.

In FIG. 15, the customer is presented with a plurality of choices (e.g., hotel room choices) Item 1-M, and makes an initial pick. The initial choice is as follows: Customer i chooses product j when (e.g., an alternative way to write the acceptance probability disclosed above):

$$v_j + \epsilon_{ij} \geq \max\{v_0 + \epsilon_{i0}, v_1 + \epsilon_{i1}, \ldots, v_N + \epsilon_{iN}\}$$

Figure 16:
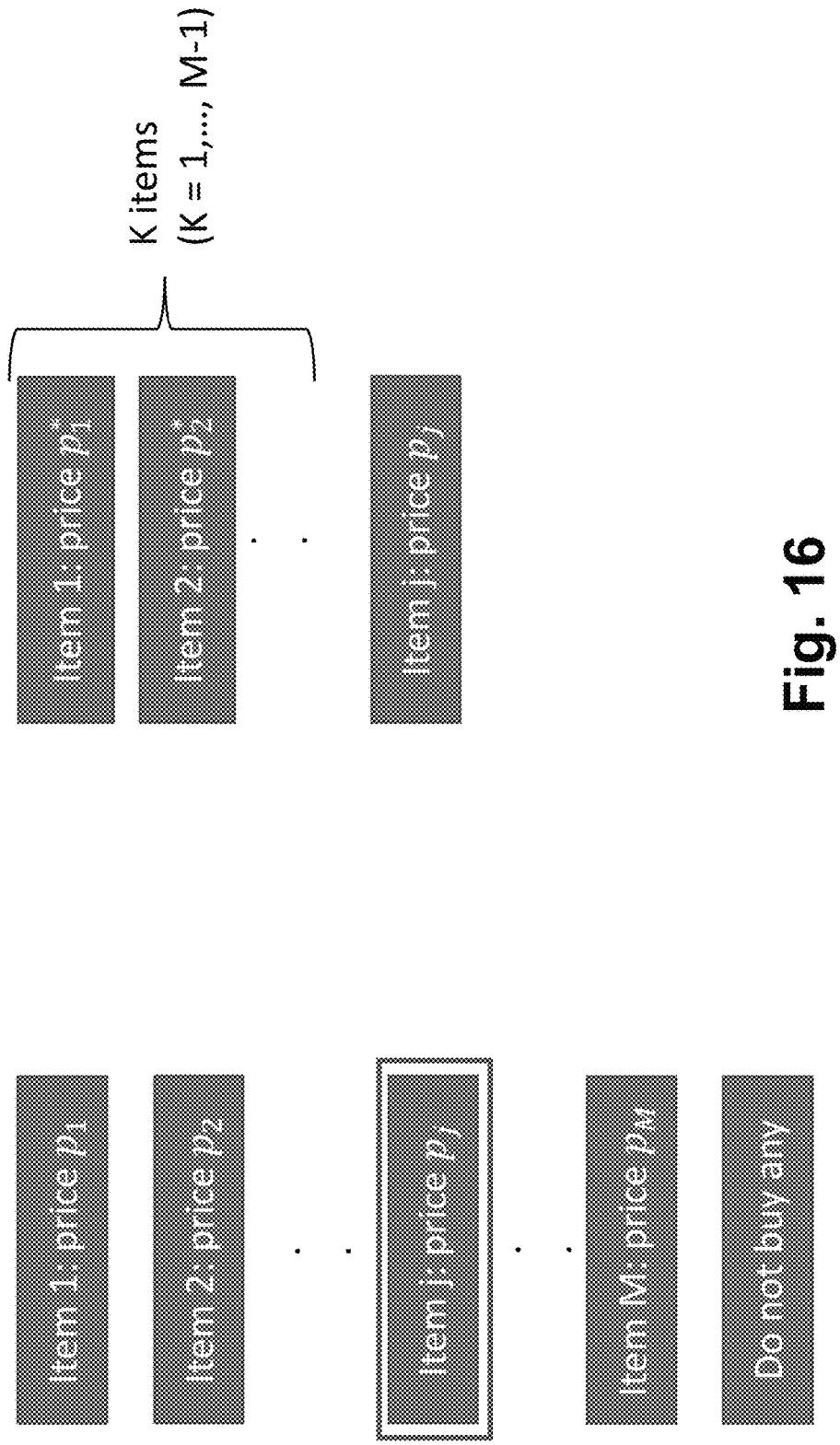

In FIG. 16, the customer makes the initial pick of Item j, and in response the hotel sends a promotion email with K items and revised pricing (to encourage upselling) for the subset of items from the initial offer except the item selected by the customer. As the selection probability depends on the display position of the item, the order of the items is optimized together with their prices. FIG. 16 illustrates an embodiment with multiple upsell offers (i.e., Item 1, Item 2, etc.) that may not include all items from the initial offer or may even consist of a single item.

Figure 17:
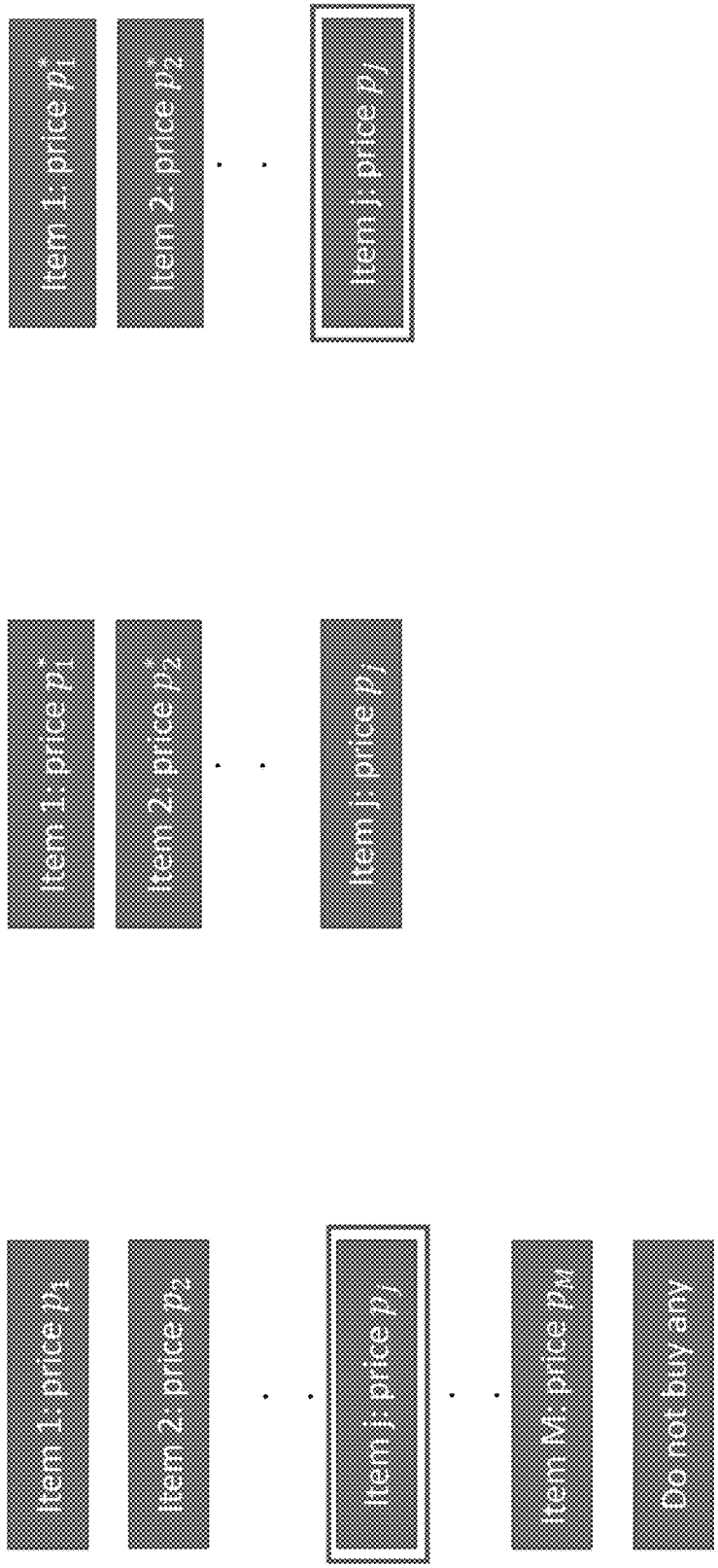

In FIG. 17, the final choice of the customer is received. As shown, in the example shown, the final choice of the customer is the original choice, Item j (i.e., the customer has not chosen any of the upsell offers. Embodiments are only interested in predicting the customer's reaction to one or more promotional offers (i.e., no initial choice predictions). In FIG. 17, the customer switches to product 2 (an alternative item) at discounted price $p_2^*$(accepts upgrade offer) with probability:

$$P(a|p_2^*)=P(v_2-\beta(p_2^*-p_2)+\epsilon_{i2}>v_1+\epsilon_{i1}|v_1+\epsilon_{i1}\geq\max\{v_0+\epsilon_{i0},v_1+\epsilon_{i1},\ldots,v_N+\epsilon_{iN}\})$$

Figure 18:

FIG. 18 illustrates an embodiment with only a single upsell offer. In this example, the customer's initial pick is Item 1, and in response Item 1 (the initial choice) and a single upsell item 2 is shown. In the example of FIG. 18, only price is optimized at 710 as there is no need to optimize display ordering since there is only a single upsell offer to choose. For the single upsell offer embodiment, when price of the item j is lowered from $p_j$ to $p_j^*$, the acceptance probability of the upgrade offer acceptance is:

$$P_{ij}(p_j^*) = \frac{e^{v_j-\beta(p_j^*-p_j)} - e^{v_j}}{e^{v_j-\beta(p_j^*-p_j)} - e^{v_j} + \sum_{j' \in S_i} e^{v_{j'}}}$$

where $S_i$ is the initial offer consideration set presented to the customer i and $$v_j = \sum_{k \in K} \alpha_k x_{jk} - \beta p_j - \gamma z_j$$

In response to the pricing and optimal choices offered, embodiments accept reservations based on optimized pricing, and facilitate hotel stays based on reservations. The optimized pricing may be stored in a database in the form of specialized data. Facilitating hotel stays can include transmitting the specialized data to other specialized devices that use the data such as using the data to automatically encode hotel keys, using the data to automatically program hotel room door locks, etc.

Referring again to FIG. 7, the result of the customer's "final" choice (i.e., either the initial choice or an upsell choice) is stored in database 352 as an additional observation of demand. The observed choice is input at 704, which results in an iterative process in which the model at 708 is ultimately retrained.

As disclosed, embodiments in general solve at least two main problems: modeling the discrete-choice demand as driven by the several selected features and determining their relative weights. As the features include the price of each choice, the solution to the problem allows for a monetary estimate of each feature based on the guests' willingness to pay. For example, embodiments can estimate the guests' willingness to pay for the upgrade to a larger room or a room with a better view.

In a first step, the hotel room features are extracted from the natural language room description as uni- bi- and tri-grams, that is, one, two, or three consecutive words, and an approximate demand modeling problem is solved, which essentially models every single choice separately as a binary outcome. Since the number of the n-grams features can be very large, this simplified modeling approach provides an efficient mechanism to process all initial features. The feature selection is achieved by so-called L1 regularization that adds a linear penalty function of the feature value to the likelihood estimator, which results in some of the feature values becoming zero in the optimal solution. The computation of the penalized maximum likelihood estimator ("MLE") is performed by using a stochastic gradient descent ("SGD") algorithm, which allows for fast convergence to the optimal function value. After the initial selection of the room features, the interaction variables for the guest booking attributes are added to the model in order to estimate the variability of each feature value among different guest types. For example, such features as booking price and room size may have different values for the guests booking on corporate or personal accounts. In this case, the interaction variable expressed as the product of price variable and corporate account binary variable expresses the changes in price sensitivity between customers using corporate and personal accounts. The feature selection process described above is then re-applied in order to filter out insignificant interaction variables. The remaining interaction variables are then used to estimate the relative weights of the guest booking attributes that are used for clustering at the next step.

A second step begins with soft clustering of the hotel guests and the application of the modified multinomial logit ("MNL") model to each cluster of the hotel guests. The idea behind soft clustering is that a guest can belong to more than one category or cluster. For example, a guest could be split 40/60 between leisure and vacation categories reflecting the uncertainty of the nature of their stay. As the clustering is unsupervised learning, traditionally, all variables are scaled to the same standard deviation, usually one. However, in embodiments, the variables are scaled to the standard deviation proportional to their logistic regression coefficients obtained at the previous step to reflect their predictive power for the guests' choices. After scaling is performed, the MNL-based upsell-predicting model is trained separately for each cluster with the choice outcome split proportionally to the guest's assignment to the cluster.

The upsell model that is used in embodiments reflects each guest's previous choice for the current room type and the probability of the future upsell choice is calculated as conditional on the previous choice. The model is fit by applying the MLE method. In this case, in order to improve the model stability due to the potential collinearity of some variables, the L2 regularization is applied by adding a term proportional to the square of the variable coefficient value. Since this term is a smooth function, it is still possible to use standard quasi-Newton gradient search algorithms. In embodiments, a packages L-BFGS method may be used. The Hessian matrix of the second derivatives estimated as "by-product" of this algorithm is used to obtain the confidence intervals of the coefficients by computing the Fisher information matrix.

Finally, the k-fold (k=5) cross-validation of the model is used to find the optimal setting of the hyper-parameters including the number of clusters and the values of the regularization penalties.

Novel functionality of embodiments of the invention include: (1) The extraction from the natural language description of the hotel rooms; (2) Feature selection through fast-converging logistic regression using SGD and L1 penalty; (3) Usage of the guest attributes and room feature interaction variables for the personalized prediction models; (4) Soft clustering of the guests using their attribute weights; and (5) Application of the MNL-based upsell-predicting model.

Advantages of embodiments of the invention include: (1) An interpretable model providing managerial insight into the relative importance of the room features; (2) Automated feature extraction that eliminates manual feature editing and entering; (3) Monetary measuring for room features; (4) Estimation of guests' willingness to pay based on their booking attributes; (5) Increased accuracy and stability of the predictive model; and (6) Guaranteed monotonicity of the prediction: the model would predict lower choice probability when its price is increased.

Referring again to FIG. 4, the use of HFL server 420, in conjunction with hierarchical prediction models 400, 410 improves results in comparison to the use of prediction models 400, 410 on a standalone basis by each separate hotel chain. By sharing the model parameters among models, without sharing data, the response to upsell offers, for example, is improved.

FIG. 19 is a table illustrating improvements through the use of HFL server 420 in accordance to embodiments. FIG. 19 uses Area Under the Curve("AUC") as the metric. AUC is defined as the area under the receiver operating characteristics curve. The higher the AUC, the better the performance of the model at distinguishing between the positive and negative classes. FIG. 19 uses two logistic regression benchmarks that represent the two extreme modeling choices. The first model (decentralized model) only uses property-level data. The second model (centralized model) uses the aggregated data from the whole chain. Embodiments offer a balance between these two extremes.

As shown in FIG. 19, column 1901 shows 3 three groups of tests conducted on three hotel groups. Column 1902 lists the hotel chains involved in each test. Each chain has a corresponding hierarchical model (e.g., models 400, 410 of FIG. 4) that provides model parameters to the HFL server 420. Column 1903 lists the multiple hotel properties that make up each chain. Some hotel groups consisted of a single chain that was using a hierarchical model to combine observations from individual properties. These chains were then processed together in a federated learning model.

Column 1904 lists the number of instances (i.e., the number of observations or the data size, that is the number of the reservations observed). Column 1905 lists the positive response ratios in response to upsell offers generated by embodiments of the invention. Column 1906 lists the AUC ROC single model results, where the closer to 1 the better. Embodiments utilize the AUC-ROC score as a performance measurement for the classification problems at various threshold settings. ROC is a probability curve and AUC represents the degree or measure of separability. It tells how much the model is capable of distinguishing between classes. The higher the AUC, the better the model is at predicting 0 class as 0 and 1 classes as 1. The "single model" performance benchmark uses data from a single property without any aggregation. Column 1907 lists AUC ROC client model (best round) results which shows the HFL results on a property. Column 1908 lists the AUC ROC client model results for the empirically determined the best number of iterations (best round), the improvement determined by comparing 1906 and 1907. The centralized model represented by its results in column 1908 shows the outcomes for the case when the data from the properties belonging to different chains can be pooled together. In this case, the results are comparable with the federated learning outcome in accordance to embodiments. However, this approach of column 1908, in comparison to embodiments, may not be practically implementable due to the potential data sharing restrictions between different chains.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of upselling a hotel room selection, the method comprising:

generating a first hierarchical prediction model corresponding to a first hotel chain, the first hierarchical prediction model receiving reservation data from one or more corresponding first hotel properties, wherein the first hierarchical prediction model comprises a first Multinomial Logit (MNL) model using Bayesian inference;

generating a second hierarchical prediction model corresponding to a second hotel chain, the second hierarchical prediction model receiving reservation data from one or more corresponding second hotel properties, wherein the second hierarchical prediction model comprises a second Multinomial Logit (MNL) model using Bayesian inference;

generating the first hierarchical prediction model and generating the second hierarchical prediction model comprises receiving a plurality of textual room descriptions that define different types of hotel rooms, data mining the plurality of textual room descriptions to generate a plurality of features, and using at least a subset of the plurality of features to train the first MNL model and the second MNL model;

at each of the first hierarchical prediction model and the second hierarchical prediction model, generating corresponding model parameters, the model parameters comprising at least one of a feature value, a price sensitivity coefficient or a display position coefficient;

at a horizontal federated server, receiving the corresponding model parameters and averaging the model parameters to be used as a new probability distribution for the Bayesian inference;

distributing the new probability distribution to the first hotel properties and the second hotel properties; and using the new probability distribution, retraining the first hierarchical prediction model and the second hierarchical prediction model.

2. The method of claim 1, wherein the reservation data is not sent to the horizontal federated server.

3. The method of claim 1, wherein the corresponding model parameters comprise:

$\alpha_k$=feature k value (estimated parameter);
$\beta$=price sensitivity coefficient (estimated parameter); and
$\gamma$=display position coefficient (estimated parameter).

4. The method of claim 1, wherein the first hierarchical prediction model and the second hierarchical prediction model comprise Bayesian hierarchical modelling.

5. The method of claim 1, wherein the reservation data corresponding to the first hotel chain is not shared with the second hotel chain, and generating the first hierarchical prediction model comprises:

receiving a plurality of textual room descriptions that define different types of hotel rooms categories:

data mining the plurality of textual room descriptions to generate a plurality of features, the data mining comprising tokenizing each of the textual room descriptions;

selecting a subset of the plurality of features using a regularized logistic regression model, the regularized logistic regression model fitted by likelihood maximization using a stochastic gradient descent, the regularized logistic regression model comprising estimated parameters comprising a feature value, a price sensitivity coefficient and a display position coefficient; and generating and training the first hierarchical prediction model using the subset of features selected by the regularized logistic regression model as the first MNL model comprising the estimated parameters.

6. The method of claim 1, further comprising, based on the new probability distribution at each of the first hotel properties and the second hotel properties:

providing a first plurality of hotel room choices, each first plurality of hotel room choices comprising a first type of hotel room and a corresponding first price;

receiving a first selection of one of the first plurality of hotel room choices; and in response to the first selection, providing a second plurality of hotel room choices, the second plurality of hotel room choices comprising a subset of the first types of hotel room choices and a corresponding optimized price that is different from the respective corresponding first price.

7. The method of claim 6, further comprising:

determining an optimized display order for the second plurality of hotel room choices.

8. The method of claim 6, further comprising:

receiving a second selection of one of the second plurality of hotel room choices;

based on at least the second selection, re-training the respective MNL model;

in response to the second selection, reserving a first hotel room at the optimized price, generating corresponding specialized data and transmitting the specialized data to a hotel room key machine;

in response to receiving the specialized data, automatically encoding a hotel room key that corresponds to the first hotel room using the hotel room key machine.

9. A non-transitory computer readable medium having instructions stored thereon that, when executed by one or more processors, cause the processors to upsell a hotel room selection, the upselling comprising:

generating a first hierarchical prediction model corresponding to a first hotel chain, the first hierarchical prediction model receiving reservation data from one or more corresponding first hotel properties, wherein the first hierarchical prediction model comprises a first Multinomial Logit (MNL) model using Bayesian inference;

generating a second hierarchical prediction model corresponding to a second hotel chain, the second hierarchical prediction model receiving reservation data from one or more corresponding second hotel properties, wherein the second hierarchical prediction model comprises a second Multinomial Logit (MNL) model using Bayesian inference;

generating the first hierarchical prediction model and the generating the second hierarchical prediction model comprises receiving a plurality of textual room descriptions that define different types of hotel rooms, data mining the plurality of textual room descriptions to generate a plurality of features, and using at least a subset of the plurality of features to train the first MNL model and the second MNL model;

at each of the first hierarchical prediction model and the second hierarchical prediction model, generating corresponding model parameters, the model parameters comprising at least one of a feature value, a price sensitivity coefficient or a display position coefficient;

at a horizontal federated server, receiving the corresponding model parameters and averaging the model parameters to be used as a new probability distribution for the Bayesian inference;

distributing the new probability distribution to the first hotel properties and the second hotel properties; and using the new probability distribution, retraining the first hierarchical prediction model and the second hierarchical prediction model.

10. The computer readable medium of claim 9, wherein the reservation data is not sent to the horizontal federated server.

11. The computer readable medium of claim 9, wherein the corresponding model parameters comprise:

$\alpha_k$=feature k value (estimated parameter);
$\beta$=price sensitivity coefficient (estimated parameter); and
$\gamma$=display position coefficient (estimated parameter).

12. The computer readable medium of claim 9, wherein the first hierarchical prediction model and the second hierarchical prediction model comprise Bayesian hierarchical modelling.

13. The computer readable medium of claim 9, wherein the reservation data corresponding to the first hotel chain is not shared with the second hotel chain, and generating the first hierarchical prediction model comprises:

receiving a plurality of textual room descriptions that define different types of hotel room categories;

data mining the plurality of textual room descriptions to generate a plurality of features, the data mining comprising tokenizing each of the textual room descriptions;

selecting a subset of the plurality of features using a regularized logistic regression model, the regularized logistic regression model fitted by likelihood maximization using a stochastic gradient descent, the regularized logistic regression model comprising estimated parameters comprising a feature value, a price sensitivity coefficient and a display position coefficient; and generating and training the first hierarchical prediction model using the subset of features selected by the regularized logistic regression model as the first MNL model comprising the estimated parameters.

14. The computer readable medium of claim 9, the upselling further comprising, based on the new probability distribution at each of the first hotel properties and the second hotel properties:

providing a first plurality of hotel room choices, each first plurality of hotel room choices comprising a first type of hotel room and a corresponding first price;

receiving a first selection of one of the first plurality of hotel room choices; and in response to the first selection, providing a second plurality of hotel room choices, the second plurality of hotel room choices comprising a subset of the first types of hotel room choices and a corresponding optimized price that is different from the respective corresponding first price.

15. The computer readable medium of claim 14, the upselling further comprising:

determining an optimized display order for the second plurality of hotel room choices.

16. The computer readable medium of claim 14, the upselling further comprising:

receiving a second selection of one of the second plurality of hotel room choices;

based on at least the second selection, re-training the MNL model;

in response to the second selection, reserving a first hotel room at the optimized price, generating corresponding specialized data and transmitting the specialized data to a hotel room key machine;

in response to receiving the specialized data, automatically encoding a hotel room key that corresponds to the first hotel room using the hotel room key machine.

17. A hotel reservation system that upsells a hotel room selection comprising:

a horizontal federated server;

a first hierarchical prediction model corresponding to a first hotel chain coupled to the horizontal federated server, the first hierarchical prediction model receiving reservation data from one or more corresponding first hotel properties, wherein the first hierarchical prediction model comprises a first Multinomial Logit (MNL) model using Bayesian inference;

a second hierarchical prediction model corresponding to a second hotel chain coupled to the horizontal federated server, the second hierarchical prediction model receiving reservation data from one or more corresponding second hotel properties, wherein the second hierarchical prediction model comprises a second Multinomial Logit (MNL) model using Bayesian inference;

wherein generating the first hierarchical prediction model and the generating the second hierarchical prediction model comprises receiving a plurality of textual room descriptions that define different types of hotel rooms, data mining the plurality of textual room descriptions to generate a plurality of features, and using at least a subset of the plurality of features to train the first MNL model and the second MNL model;

wherein the horizontal federated server is configured to receive corresponding model parameters from each of the first hierarchical prediction model and the second hierarchical prediction model, the model parameters comprising at least one of a feature value, a price sensitivity coefficient or a display position coefficient, averaging the model parameters to be used as a new probability distribution for the Bayesian inference, and distribute the new probability distribution to the first hotel properties and the second hotel properties, and use the new probability distribution, retraining the first hierarchical prediction model and the second hierarchical prediction model.

18. The system of claim 17, wherein the reservation data is not sent to the horizontal federated server.

19. The system of claim 17, wherein the reservation data corresponding to the first hotel chain is not shared with the second hotel chain, and generating the first hierarchical prediction model comprises:

receiving a plurality of textual room descriptions that define different types of hotel room categories;

data mining the plurality of textual room descriptions to generate a plurality of features, the data mining comprising tokenizing each of the textual room descriptions;

selecting a subset of the plurality of features using a regularized logistic regression model, the regularized logistic regression model fitted by likelihood maximization using a stochastic gradient descent, the regularized logistic regression model comprising estimated parameters comprising a feature value, a price sensitivity coefficient and a display position coefficient; and generating and training the first hierarchical prediction model using the subset of features selected by the regularized logistic regression model as the first MNL model comprising the estimated parameters.

20. The system of claim 17, further comprising, based on the new probability distribution at each of the first hotel properties and the second hotel properties:

providing a first plurality of hotel room choices, each first plurality of hotel room choices comprising a first type of hotel room and a corresponding first price;

receiving a first selection of one of the first plurality of hotel room choices; and in response to the first selection, providing a second plurality of hotel room choices, the second plurality of hotel room choices comprising a subset of the first types of hotel room choices and a corresponding optimized price that is different from the respective corresponding first price.

* * * * *

UNITED STATES PATENT AND TRADEMARK OFFICE
CERTIFICATE OF CORRECTION

Page 1 of 2

PATENT NO. : 12,243,067 B2
APPLICATION NO. : 18/049402
DATED : March 4, 2025
INVENTOR(S) : Vakhutinsky et al.

It is certified that error appears in the above-identified patent and that said Letters Patent is hereby corrected as shown below:

In the Drawings

On sheet 11 of 19, Fig. 11, Line 2, delete "coefiicients" and insert -- coefficients --.

In the Specification

In Column 2, Line 15, delete "in in" and insert -- in --, therefor.

In Column 4, Line 15, delete "that that" and insert -- that --, therefor.

In Column 10, Line 31, delete "A" and insert -- $\Lambda$ --, therefor.

In Column 14, Line 26, delete "in in" and insert -- in --, therefor.

In Column 16, Line 4, delete "ay" and insert -- $\alpha_j^h$ --, therefor.

In Column 16, Line 29, before "maxR" insert -- (P): --, therefor.

In Column 17, Line 59, after "∀m" insert -- (7) --, therefor.

In Column 17, Line 61, after "∀j" insert -- (8) --, therefor.

In Column 17, Line 64, after "m" insert -- (9) --, therefor.

In Column 18, Line 3, delete "(PLS)" and insert -- ($P^{LS}$) --, therefor.

In Column 19, Line 1, delete "$s_{jm}$*" and insert -- $s_{jm}^{3*}$ --, therefor.

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 12,243,067 B2

In Column 19, Line 2, delete "$s_{jmk}*$" and insert -- $s_{jmk}^{3*}$ --, therefor.

In Column 19, Line 22, delete "$\mathcal{N}^0$" and insert -- $|\mathcal{N}^0|$ --, therefor.

In Column 22, Line 1, delete "$v_{ij}=\alpha_j^{h(i)}-\beta^{h(i)}-\gamma^{h(i)}\Sigma_m m x_{ijm}$," and insert -- $v_{ij} = \alpha_j^{h(i)} - \beta^{h(i)} p_{ij} - \gamma^{h(i)} \sum_m m x_{ijm}$, --, therefor.

In Column 22, Line 57, delete "reference" and insert -- reference. --, therefor.

In the Claims

In Column 27, Line 28, in Claim 5, delete "rooms categories:" and insert -- room categories; --, therefor.

In Column 30, Line 2, in Claim 17, delete "and the" and insert -- and --, therefor.

In Column 30, Line 17, in Claim 17, delete "inference, and" and insert -- inference, --, therefor.